(12) United States Patent
O'Boyle et al.

(10) Patent No.: US 6,968,073 B1
(45) Date of Patent: Nov. 22, 2005

(54) OCCUPANT DETECTION SYSTEM

(75) Inventors: Michael E. O'Boyle, Brighton, MI (US); Gregory G. Schamp, South Lyon, MI (US); Owen A. Davies, Goleta, CA (US); James C. Demro, Santa Barbara, CA (US); Debbie E. Nachtegall, Royal Oak, MI (US); William P. Wernette, Brighton, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 569 days.

(21) Appl. No.: 10/132,349

(22) Filed: Apr. 24, 2002

Related U.S. Application Data

(60) Provisional application No. 60/286,204, filed on Apr. 24, 2001.

(51) Int. Cl.$^7$ .............................................. G06K 9/00
(52) U.S. Cl. .......................... 382/104; 382/168; 356/3; 340/933
(58) Field of Search ................................ 382/103, 104, 382/106, 107, 108, 144, 168–172, 181, 184, 382/151, 188, 190–195, 199, 203, 221, 255, 382/258, 266, 269–274, 282, 318, 305, 321, 382/3, 5.01; 280/735; 381/386; 345/168; 703/6; 366/268; 340/907, 933; 348/113

(56) References Cited

U.S. PATENT DOCUMENTS

| | | | |
|---|---|---|---|
| 4,625,329 A | 11/1986 | Ishikawa et al. ............... 382/1 |
| 4,864,121 A | 9/1989 | Pietzsch ..................... 250/221 |
| 4,918,583 A * | 4/1990 | Kudo et al. .................. 366/268 |
| 4,933,541 A | 6/1990 | Dufour ....................... 250/202 |
| 4,954,962 A | 9/1990 | Evans, Jr. et al. .......... 364/513 |
| 5,016,173 A | 5/1991 | Kenet et al. ............ 364/413.13 |
| 5,039,035 A | 8/1991 | Fitzpatrick .................. 244/122 |
| 5,040,116 A | 8/1991 | Evans, Jr. et al. ...... 364/424.02 |
| 5,381,236 A | 1/1995 | Morgan ....................... 356/376 |
| 5,528,698 A * | 6/1996 | Kamei et al. ................ 382/100 |
| 5,531,472 A * | 7/1996 | Semchena et al. .......... 280/735 |

(Continued)

FOREIGN PATENT DOCUMENTS

CA            2244061        9/1998      ............ B60N 2/44

OTHER PUBLICATIONS

Rafii et al., U.S. Appl. No. 60/231,184, Filed on Sep. 9, 2000.

(Continued)

*Primary Examiner*—Bhavesh M. Mehta
*Assistant Examiner*—Seyed Azarian
(74) *Attorney, Agent, or Firm*—Raggio & Dinnin, P.C.

(57) ABSTRACT

An eye-safe light curtain is generated by a plurality of LED's illuminating a cylindrical lens having a corrugated cylindrical surface. A camera generates a first image of an avoidance zone boundary of an air bag inflator with the light curtain off, and a second image of with the light curtain on along the avoidance zone boundary. The first image is subtracted from the second image, and the resulting difference image is binned to enhance signal strength. A penetration of the avoidance zone is classified from features of the leading edge of the binned image, and the air bag inflator is disabled if the avoidance zone is penetrated by an occupant at risk of injury from the deployment thereof. An image of the light curtain may be recovered for high ambient lighting conditions by adapting the exposure time of the camera responsive to the percentage of pixels in a mask region of the first image having values exceeding a threshold.

15 Claims, 15 Drawing Sheets

U.S. PATENT DOCUMENTS

| | | | |
|---|---|---|---|
| 5,684,898 A * | 11/1997 | Brady et al. | 382/282 |
| 5,785,347 A * | 7/1998 | Adolph et al. | 280/735 |
| 5,852,672 A | 12/1998 | Lu | 382/154 |
| 5,983,147 A | 11/1999 | Krumm | 701/45 |
| 5,988,862 A * | 11/1999 | Kacyra et al. | 703/6 |
| 6,005,957 A * | 12/1999 | Meeks | 381/386 |
| 6,005,958 A | 12/1999 | Farmer et al. | 382/103 |
| 6,027,138 A | 2/2000 | Tanaka et al. | 280/735 |
| 6,113,137 A | 9/2000 | Mizutani et al. | 280/735 |
| 6,167,155 A | 12/2000 | Kostrzewski et al. | 382/232 |
| 6,198,998 B1 * | 3/2001 | Farmer et al. | 701/45 |
| 6,512,838 B1 * | 1/2003 | Rafii et al. | 382/106 |
| 6,587,186 B2 * | 7/2003 | Bamji et al. | 356/5.01 |
| 6,614,422 B1 | 9/2003 | Rafii et al. | 345/168 |
| 6,674,895 B2 | 1/2004 | Rafii et al. | 382/154 |
| 6,710,770 B2 * | 3/2004 | Tomasi et al. | 345/168 |
| 2001/0019361 A1 | 9/2001 | Savoye | 348/222 |
| 2001/0035636 A1 | 11/2001 | Adachi | 280/735 |
| 2002/0018649 A1 | 2/2002 | Hakamata | 396/17 |
| 2002/0021287 A1 | 2/2002 | Tomasi et al. | 345/168 |
| 2002/0024808 A1 | 2/2002 | Suehiro et al. | 362/245 |
| 2002/0140633 A1 | 10/2002 | Rafii et al. | 345/8 |
| 2003/0132921 A1 | 7/2003 | Torunoglu et al. | 345/173 |
| 2003/0156756 A1 | 8/2003 | Gokturk et al. | 382/190 |
| 2003/0165048 A1 | 9/2003 | Bamji et al. | 361/681 |
| 2003/0169906 A1 | 9/2003 | Gokturk et al. | 382/115 |
| 2003/0174125 A1 | 9/2003 | Torunoglu et al. | 345/168 |
| 2003/0235341 A1 | 12/2003 | Gokturk et al. | 382/243 |
| 2004/0046744 A1 | 3/2004 | Rafii et al. | 345/168 |
| 2004/0066500 A1 | 4/2004 | Gokturk et al. | 356/40.1 |
| 2004/0136564 A1 | 7/2004 | Roeber et al. | 382/100 |
| 2004/0153229 A1 | 8/2004 | Gokturk et al. | 701/45 |
| 2005/0024324 A1 | 2/2005 | Tomasi et al. | 345/156 |

OTHER PUBLICATIONS

Tomasi, U.S. Appl. No. 60/272,120, Filed on Feb. 27, 2001.

Rafii et al., U.S. Appl. No. 60/287,115, Filed on Apr. 27, 2001.

U.S. Appl. No. 09/882,959, *Occupant Sensor*, Naveed Mahbub, Filed on Jun. 15, 2001.

* cited by examiner

US 6,968,073 B1

OCCUPANT DETECTION SYSTEM

CROSS-REFERENCE TO RELATED APPLICATIONS

The instant application claims the benefit of U.S. Provisional Application Ser. No. 60/286,204 filed on Apr. 24, 2001, which is incorporated herein by reference.

BRIEF DESCRIPTION OF THE DRAWINGS

In the accompanying drawings:

FIG. 8 illustrates an end-profile of the light source;

FIG. 16b illustrates an interior, forward looking view of a light source and a camera, further illustrating a light curtain generated by the light source;

FIG. 16c illustrates a projection of an avoidance zone boundary on a light curtain in an X-Z plane;

FIG. 22b illustrates a leading edge image signal corresponding to the image illustrated in FIG. 22a;

FIG. 23b illustrates a leading edge image signal corresponding to the image illustrated in FIG. 23a;

FIG. 24b illustrates a leading edge image signal corresponding to the image illustrated in FIG. 24a;

DESCRIPTION OF EMBODIMENT(S)

A vehicle may contain safety restraint actuators that are activated responsive to a vehicle crash for purposes of mitigating occupant injury. Examples of such automatic safety restraint actuators include air bags, seat belt pretensioners, and side curtains. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. Automatic restraint systems can benefit from dynamic suppression provides for disabling an airbag or other safety device in pre-crash braking situations or concatenated crash events, and there exists a need for an improved occupant detection system that is sufficiently fast under pre-crash braking or crash conditions to detect whether or not an occupant is located so as to be likely at risk of injury from the deployment of the automatic restraint system, shortly before a prospective deployment thereof.

Figure 1:
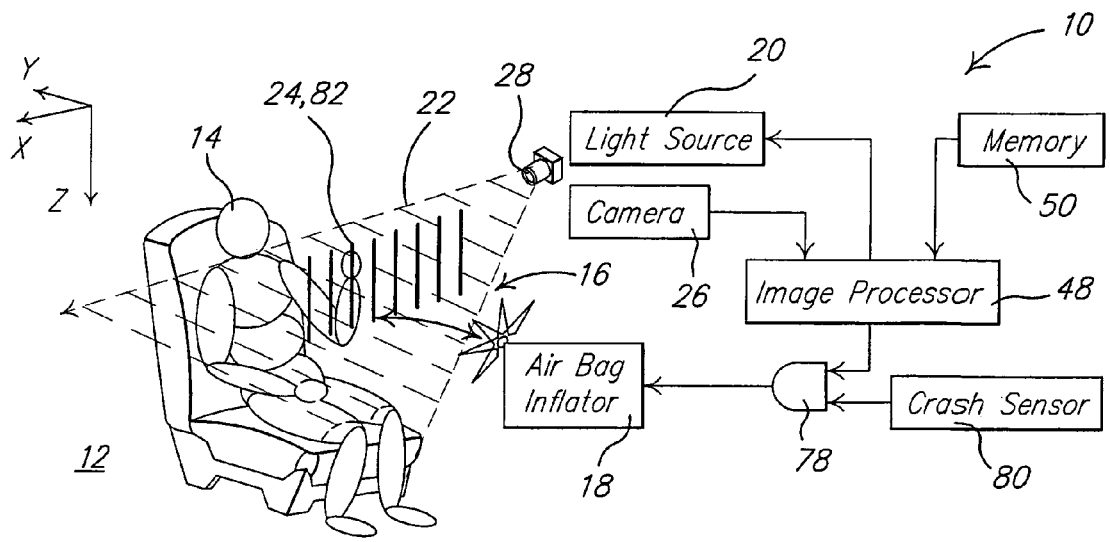
FIG. 1 illustrates a normally seated occupant in a vehicle that incorporates an occupant detection system for detecting the presence of an occupant within an avoidance zone proximate to an air bag inflator.
Figure 2:
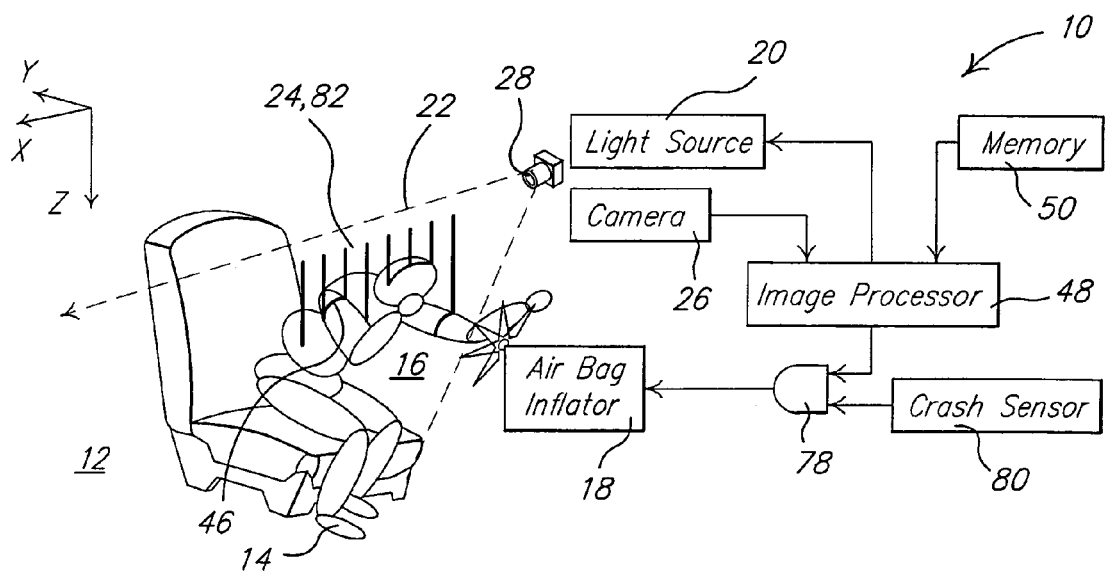
FIG. 2 illustrates an out-of-position occupant penetrating the avoidance zone proximate to an air bag inflator, wherein the occupant is being detected by the occupant detection system.

Referring to FIG. 1, an occupant detection system 10 incorporated in a vehicle 12 detects whether a portion of an occupant 14 is penetrating an avoidance zone 16 proximate to an air bag inflator 18. The avoidance zone 16 comprises a region of space within which a sufficient portion of an occupant 14 located therein would be susceptible to injury of sufficient magnitude from the deployment of the air bag inflator 18 that the air bag inflator 18 should not be deployed if the vehicle were then involved in a crash. Accordingly, if the occupant detection system 10 detects a portion of an occupant 14 penetrating the avoidance zone 16—as illustrated in FIG. 2,—the occupant detection system 10 then generates a signal that disables the air bag inflator 18. The occupant detection system 10 is adapted to be sufficiently fast to detect—just prior to a prospective deployment of the air bag inflator 18—a penetration of the avoidance zone 16 by the occupant 14 so as to provide for what is known as dynamic suppression of the deployment of the air bag inflator 18 when the occupant 14 sufficiently penetrates the avoidance zone 16. Accordingly, the occupant detection system 10 is adapted to be responsive to the motion of the occupant 14, e.g. as a result of pre-crash braking or crash-induced motion that may occur early in the crash event.

The occupant detection system 10 comprises a light source 20 that generates a light curtain 22 that bounds a surface 24 of the avoidance zone 16. A camera 26 monitors reflections of light from objects illuminated by the light source 20, e.g. from objects that penetrate the light curtain 22 and the avoidance zone 16.

FIGS. 1 and 2 illustrate a Cartesian coordinate system associated with an exemplary embodiment, wherein the Y-axis is oriented parallel to the longitudinal axis of the vehicle 12, positive rearward; the X-axis is oriented parallel to lateral axis of the vehicle 12, positive rightward, i.e., towards the passenger-side door; the Z-axis is oriented parallel to the vertical axis of the vehicle 12, positive downward; and the origin of the coordinate system is at the camera lens 28. In FIGS. 1 and 2, the point of intersection of the coordinate axes is shown displaced from the camera to avoid clutter.

The light source 20, for example, generates near-infrared light that is invisible to the naked eye, and that is adapted to be eye-safe without necessitating other forms of eye protection, thereby avoiding the regulatory and safety problems otherwise associated with laser-based illumination. However, the light source 20 is also adapted in conjunction with an associated image processing algorithm to provide sufficient illumination to be detectable under conditions of direct sunlight illumination of the occupant 14—a potential condition under which the occupant detection system 10 would need to operate. The use of structured lighting within the interior of a vehicle presents formidable challenges because it is difficult to recover the projected line in conditions of direct sunlight. In order to reduce ambient sunlight levels in the camera 26, a long-pass filter with a cut-on wavelength of approximately 800 nanometers is placed over the camera lens 28. However, even with this filter, a light source with a relatively high level of illumination power would otherwise be required—absent further image processing—in order for the camera 26 to be able to see the light curtain 22 under conditions of direct ambient sunlight illumination. The intensity of a laser beam of sufficient brightness to be visible to the camera 26 under conditions of direct ambient sunlight illumination would generally exceed the eye-safe limits for long term viewing by an occupant 14, and would thus present both regulatory and safety problems. An invisible light source 20—e.g. using a near-infrared frequency—is inconspicuous to an occupant 14, however regulations associated with near-infrared radiation are generally more stringent than for visible radiation because the eye does not exhibit a natural avoidance reaction (e.g. pupil contraction) when directly viewing an invisible light source as it does for a visible light source.

Figure 3A:
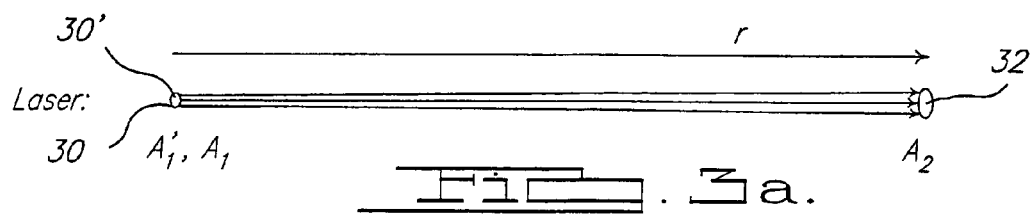
FIG. 3a illustrates the radiance of a laser beam.
Figure 3B:
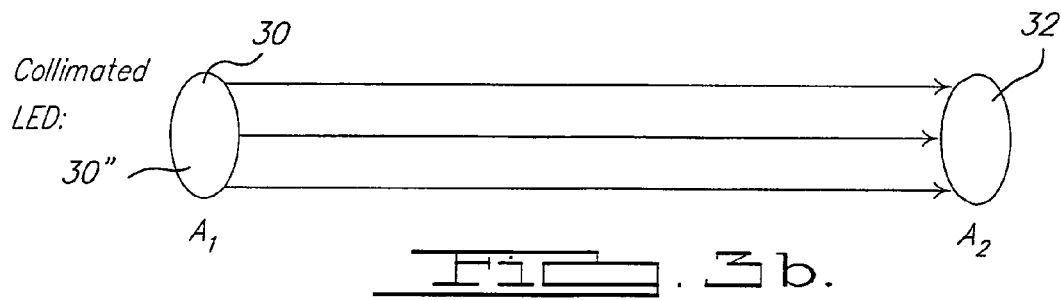
FIG. 3b illustrates the radiance of a LED.

Referring to FIGS. 3a and 3b, radiance is a mapping of flux through space from a source 30 to a receiver 32. For both the source 30 and the receiver 32 oriented normal to the direction of propagation of radiation, the source radiance L is given as the flux $\phi$ flowing between the source 30 and the receiver 32 divided by the product of the source area $A_1$ and the receiver area $A_2$, and further divided by the square of the distance r between the source 30 and the receiver 32. This can also be expressed as the irradiance $E_{receiver}$ at the receiver divided by source area $A_1$ times the square of the distance r (i.e. source solid angle). It should be noted that source radiance L is independent of the distance r between source 30 and the receiver 32. The source radiance L is given as follows:

$$L = \frac{\text{Flux/unit\_receive\_area}}{\text{unit\_source\_solid\_angle}} = \frac{\phi}{\frac{A_1}{r^2}A_2} = \frac{E_{receiver}}{\frac{A_1}{r^2}} \text{ W/cm}^2\text{steridian}$$

Accordingly, it can be seen that a laser source 30' having a relatively small source area $A_1'$, a correspondingly relatively small divergence, and a resulting relatively small receiver area $A_2$, has a correspondingly relatively high values of source radiance L, which can be unsafe to a view with a human eye receiver 32. By comparison, a LED source 30" having a relatively large source area $A_1$ and a correspondingly relatively large receiver area $A_2$ provides for a substantially lower source radiance L than laser source 30'. By increasing both the source area $A_1$ and the receiver area $A_2$, the source radiance L is substantially reduced, thereby enabling the design of a light source 20 that is eye-safe, but with sufficient associated flux $\phi$ that the signal can be recovered by subsequent image processing, even under conditions of direct ambient sunlight illumination.

The light source 20 uses an eye-safe source of illumination, e.g. light emitting diode (LED) based illumination sources in the 800–900 nanometer range, so as to provide an additional margin of safety in the event that the cover of the light source 20 were opened or otherwise broken. The United States Food and Drug Administration Center for Devices and Radiological Health sets the eye-safe limit for radiation in the 800–900 nanometer range based upon the source radiance. The light source 20 is designed so as to be eye-safe under the longest term viewing conditions, which are specified at 10,000 seconds (approximately 2.8 hours) of continuous staring into the source by a human being. For example, the Center for Devices and Radiological Health specifies that for radiation of 880 nanometers and continuous staring into the source for 10,000 seconds that the source radiance not exceed 447 milliwatts per square centimeter per steridian.

Figure 4:
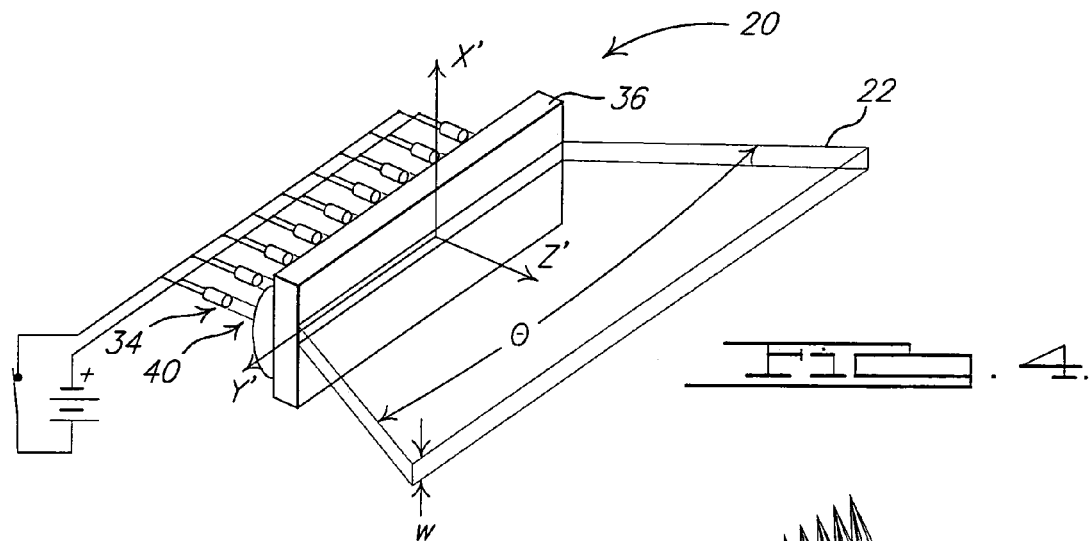
FIG. 4 illustrates a light source for generating a light curtain.
Figure 5:
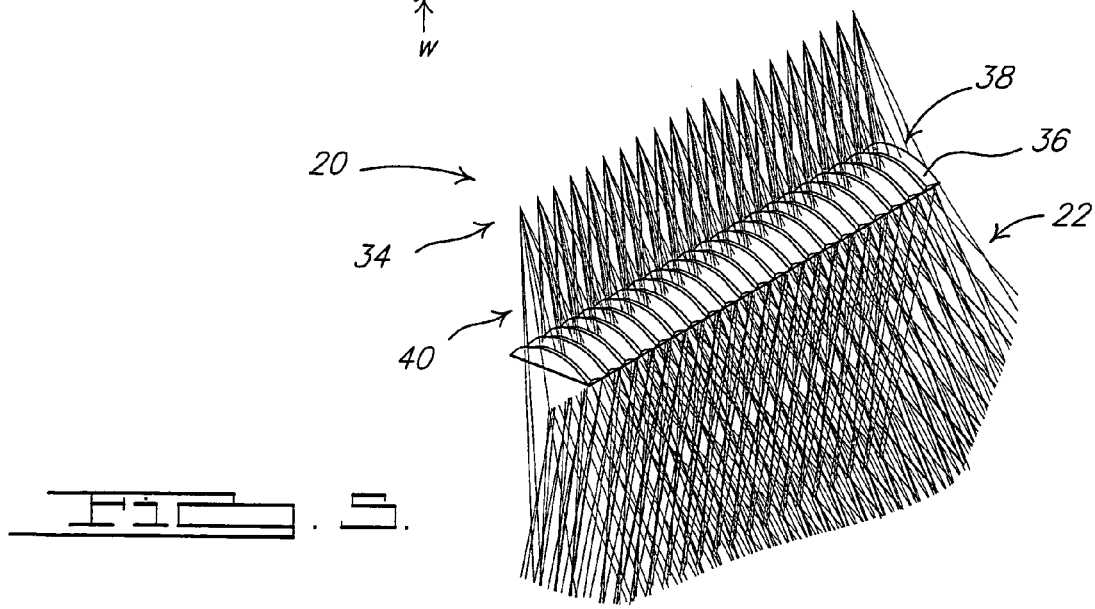
FIG. 5 illustrates a simulation of the light source.
Figure 5:
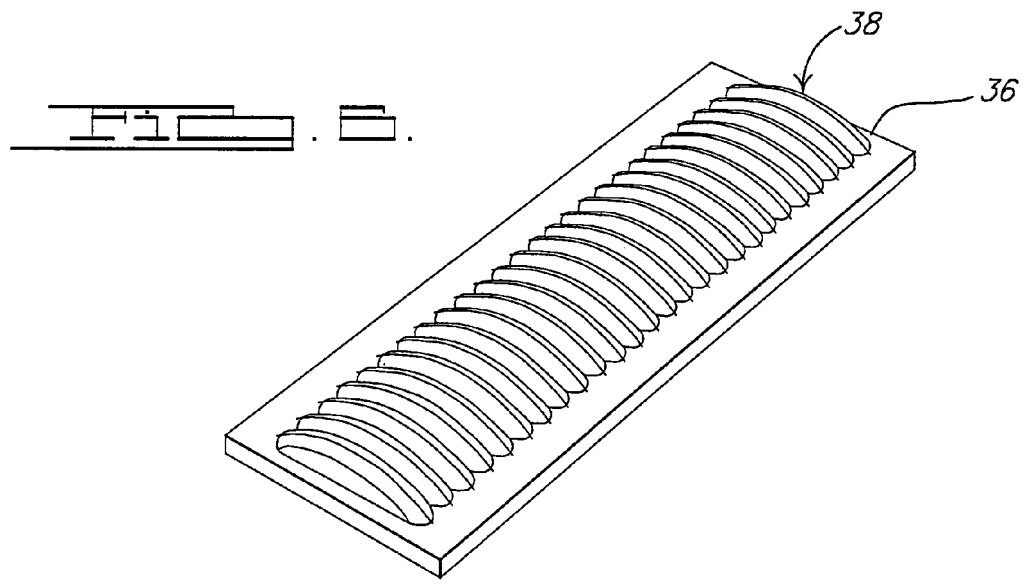
Figure 6:
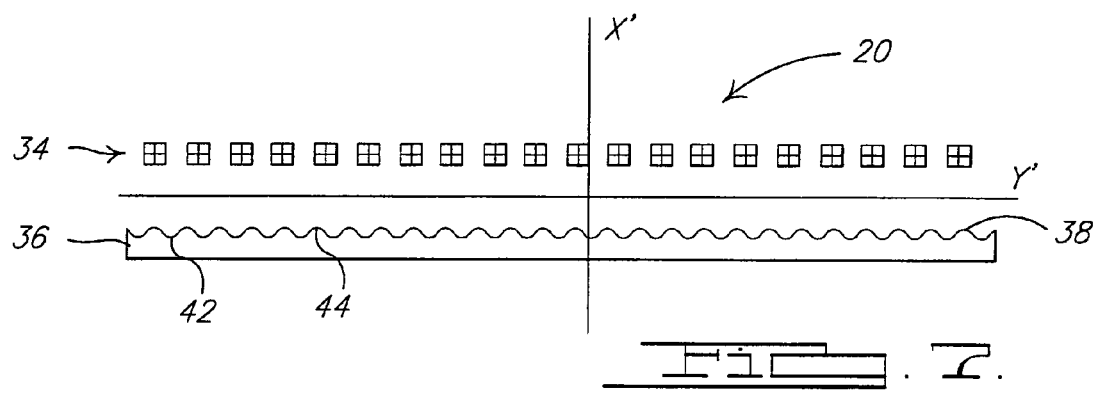
FIG. 6 illustrates a perspective view of cylindrical fan-out lens incorporated in the light source.

Referring to FIGS. 4–8, the light source 20 comprises a plurality of light emitting diodes (LED's) 34 and a cylindrical fan-out lens 36 (e.g. plano-cylindrical fan-out), the combination of which is adapted to generate a light curtain 22. Designating the longitudinal axis of the cylindrical fan-out lens 36 as Y', and the transverse axis across the planar surface of the lens as X', the LED's 34 are positioned at about one focal length in the −Z' direction from the cylindrical fan-out lens 36 so that the resulting light curtain 22 propagates in the +Z' direction, is substantially collimated in the X' direction (X'Z' plane), and fans out in the +/−Y' directions (Y'Z' plane), as illustrated in FIG. 4, wherein X', Y', and Z' are mutually orthogonal. The convex side of the cylindrical fan-out lens 36 is provided with a series of corrugations 38 that act to distribute and fan-out the light in the +/−Y' directions, so as to transform the discrete beams of light 40 generated by the LED's 34 into a light curtain 22, as further illustrated in FIG. 5 by a simulation of the operation of the light source 20. The combination of the shape(s) of the corrugations 38 and the size and Y' spacing of the LED's 34 influences the uniformity of the light curtain 22 along the Y' direction, and is adapted to provide for a relatively uniform light distribution to the extent possible.

A cylindrical lens without the corrugations 38 would produce a linear beam of light (i.e. light curtain 22), but lacks sufficient control to provide both a line of light of a particular length while also maintaining beam uniformity and intensity. Instead, the degree of fan-out (or lack thereof), and the variation of intensity along the length of the beam is governed by the light distribution characteristics of the associated LED's 34. Several LED 34 sources are generally required in order to provide sufficient a light beam of sufficient intensity.

Figure 7:
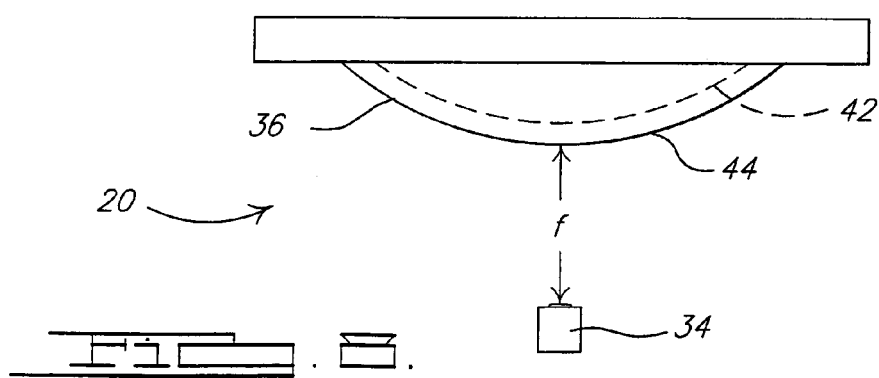
FIG. 7 illustrates a side-profile of the light source including a cross-sectional view of the cylindrical fan-out lens.

The cylindrical lens shape and corresponding focal length of the cylindrical fan-out lens 36 was chosen based on the characteristics of the associated LED 34 (e.g. beam divergence and size) and the restrictions on overall size for the particular application so as to provide for substantial collimation in the X' direction—i.e. along the thickness of the light curtain 22. The corrugations 38 on the cylindrical surface of the cylindrical fan-out lens 36 provide improved uniformity of the light curtain 22 and provide for spreading the light in the elevation, i.e. Y', direction with a sufficient fan-out so that the avoidance zone 16 can be illuminated by light from the cylindrical fan-out lens 36 that is substantially shorter—and therefor easier to package—than a cylindrical lens without benefit of the corrugations 38. The overall length of the cylindrical fan-out lens 36 was determined both by the number of LED's 34 required to provide the intensity and by the spacing of the LED's 34 in relation to the corrugations 38. In the exemplary lens illustrated in FIG. 6, the underlying cylindrical focal length was 30 millimeters. The corrugations 38 were formed by a cylindrical surface of revolution, wherein FIG. 7 illustrates the generating curve of this surface, and FIG. 8 illustrates an end-view of the cylindrical fan-out lens 36 showing the revolution of this cross-section. The corrugations 38 of the generating curve of the exemplary cylindrical fan-out lens 36 have a 1 millimeter peak-to-peak radial amplitude and a 3 millimeter peak-to-peak Y' separation, wherein the upper and lower third of the curves comprise a standard conic sections (e.g. parabolic) that are blended with a G2 continuous degree 5 span Bezier curve, as provided by a optical computer aided design (CAD) program call Rhinoceros, sold by Robert McNeel and Associates.

The plurality of LED's 34 were located along a line parallel to the longitudinal (Y') axis of the cylindrical fan-out lens 36, on the cylindrical side thereof, about one focal length away therefrom. The longitudinal (Y') spacing of the LED's 34 was different from the peak-to-peak spacing of the corrugations 38 so as to improve the uniformity of illumination along the length of the light curtain 22. The uniformity of the illumination decreased as the spacing of the LED's 34 approaches that of the corrugations 38. In the exemplary light source 20, the spacing between adjacent LED's 34 was about 4 millimeters, and the set of LED's 34 was aligned with the corrugations 38 so that every third LED 34 was aligned with a valley 42 of the corrugations 38, and none of the LED's 34 were aligned with any of the peaks 44 thereof. A concave portion of the corrugations 38 proximate to valley 42 acts as a concave refractive surface which tends to cause light illuminated therefrom by a LED 34 to diverge, whereas a convex portion of the corrugations 38 proximate to a peak 44 acts as a convex refractive surface which tends to cause light illuminated therefrom by a LED 34 to converge. Accordingly, the alignment of a LED 34 with a peak 44 tends to concentrate the light from that LED 34 along the Y' direction, thereby reducing uniformity of the light projected by the light curtain 22, so that to improve uniformity of the light projected by the light curtain 22, it is beneficial to offset the LED's 34 from the proximate peaks 44 of the corrugations 38.

Light from individual LED's 34 of the light source 20 is spread out along the length of the line of light projected by the light curtain 22, and the intensity of the light curtain 22 can be adjusted by either adjusting the intensity of the individual LED's 34 or by changing the number of LED's 34 that are incorporated in the light source 20—without redesigning the cylindrical fan-out lens 36 or, more particularly, the corrugations 38 thereof. The corrugations 38 of the cylindrical fan-out lens 36 provide for controlling the variation in intensity of the light projected by the light curtain 22, and for controlling the fan-out angle φ which determines the length of the light source 20—as determined by the length of the cylindrical fan-out lens 36—necessary to produce a light curtain 22 of sufficient extent to illuminate a particular region, for example, the boundary of the avoidance zone 16. The width w of the light curtain 22 is determined by the lateral extent of the LED's 34 and the cylindrical focal properties of the cylindrical fan-out lens 36, which includes the location of the LED's 34 relative to the cylindrical fan-out lens 36 and the distance from the cylindrical fan-out lens 36 along the light curtain 22 if the light curtain 22 is not perfectly collimated. Whereas the light source 20 has been illustrated with a cylindrical fan-out lens 36 having an underlying plano-cylindrical shape, and with the LED's 34 located on the cylindrical side of the cylindrical fan-out lens 36, it should be understood that 1) the cylindrical fan-out lens 36 could be curved on both sides, and 2) that the LED's 34 could alternately be located on the planar side of a plano-cylindrical fan-out lens 36.

The light curtain 22 generated by the light source 20 is, for example, projected in front of the air bag inflator 18 in an orientation that is, for example, substantially vertical——i.e. parallel to an X-Z plane—although this orientation is not essential. For example, the orientation of the light curtain 22 may be governed by installation or packaging requirements for the particular vehicle 12 or by the shape of the avoidance zone 16 for a particular air bag inflator 18. The camera 26 is positioned to view the plane of the light curtain 22 and detect its penetration, and is be displaced relative to the light source 20 by a fixed offset distance, e.g. by as distance sufficient to perform this function, e.g. aft (in the Y direction) of the light source 20. For example, both the light source 20 and the camera 26 might be mounted in the headliner of the vehicle 12 along the centerline thereof, e.g. in an overhead console.

The camera 26 views a profile 46 formed by the intersection of the light curtain 22 and an object intersecting therewith. The camera 26 is operatively connected to an image processor 48 that processes images from the camera 26 in real time, and compares the processed images with corresponding information stored in a memory 50, so as to detect an object, e.g. an occupant 14, penetrating the avoidance zone 16. The profile 46 comprises a relatively thick beam of light that is projected by the light curtain 22, and the thickness is sufficiently great so that the intensity of the beam of light is eye-safe, even though there is a sufficient amount of light flux φ in the beam of light so as to be detectable—after subsequent image preprocessing—under direct sunlight conditions that would otherwise appear to obscure the profile 46.

Figure 9:
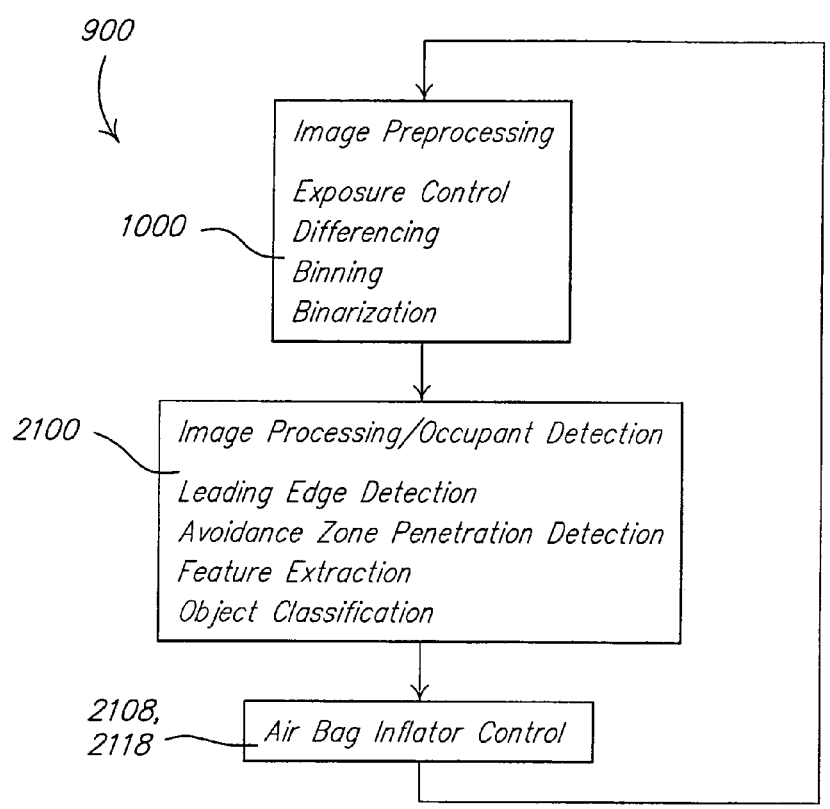
FIG. 9 illustrates a flow chart of an image preprocessing process and an image processing process for an occupant detection system.

Referring to FIG. 9, the occupant detection system 10 operates in accordance with a process 900 wherein an image signal from the camera 26 is first processed by an image preprocessing process 1000 to extract the profile 46 formed by the intersection of the light curtain 22 and an object intersecting therewith. The image preprocessing process 1000 1) adjusts the exposure time of the camera 26 as necessary to prevent reflected sunlight in the image from saturating the camera 26, 2) forms a difference image by subtracting an image of the background with the light curtain 22 OFF from an image with the light curtain 22 ON, so as to eliminate common-mode image signals, thereby resulting in an image of the profile 46, 3) boosts the signal corresponding to the image of the profile 46, and 4) binarizes the boosted image signal so as to form the preprocessed image. The preprocessed image is then processed by an occupant detection process 2100 which calculates features of the profile 46 and classifies the type of occupant or object therefrom, responsive to which, the air bag inflator 14 is either enabled in step (2108), or disabled or attenuated in step (2118), depending upon whether or not the classification corresponds to an occupant 14 who would be at risk of injury from the deployment of the air bag inflator 14.

Figure 10:
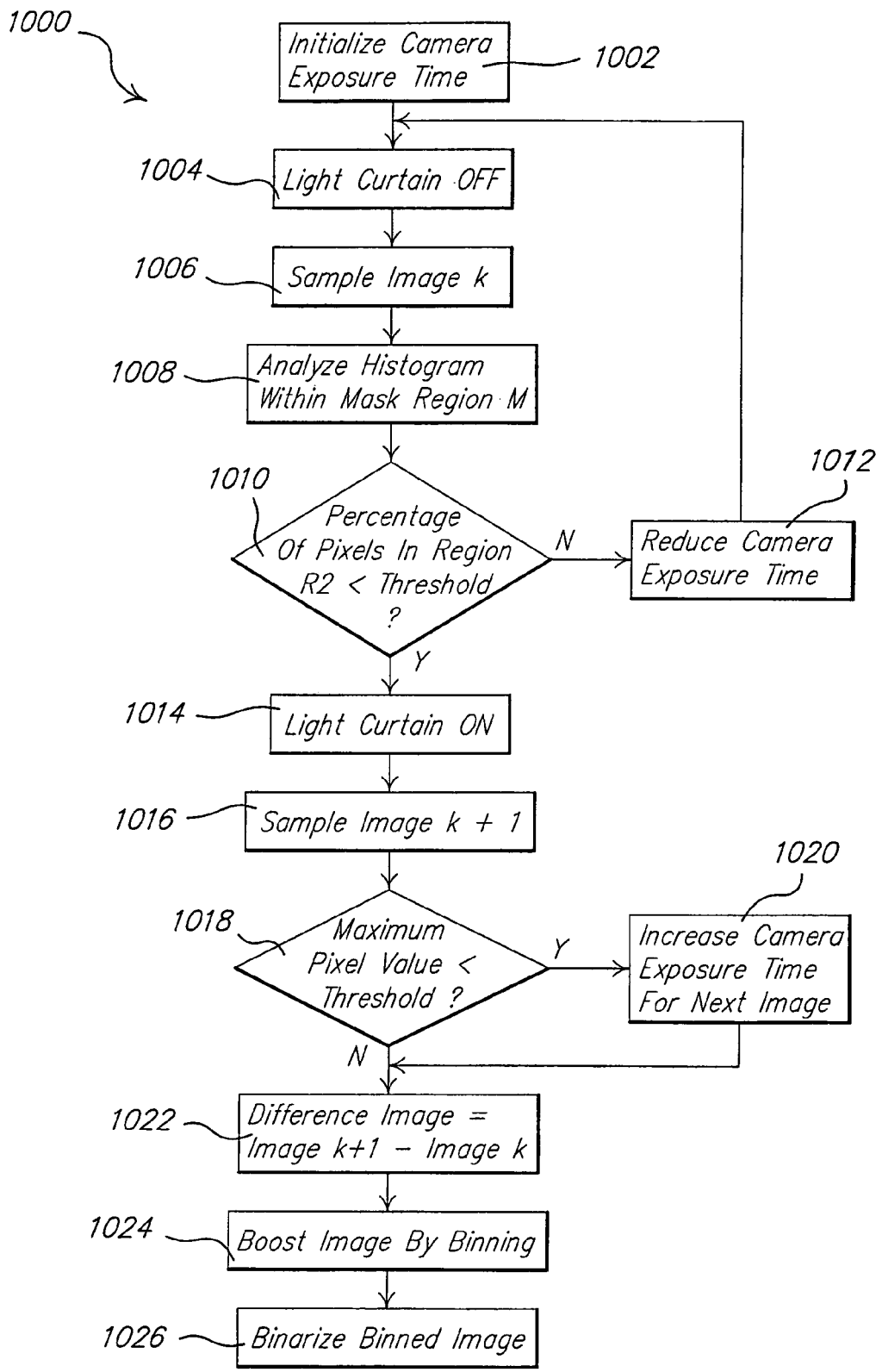
FIG. 10 illustrates a flow chart of the image preprocessing process.
Figure 11:
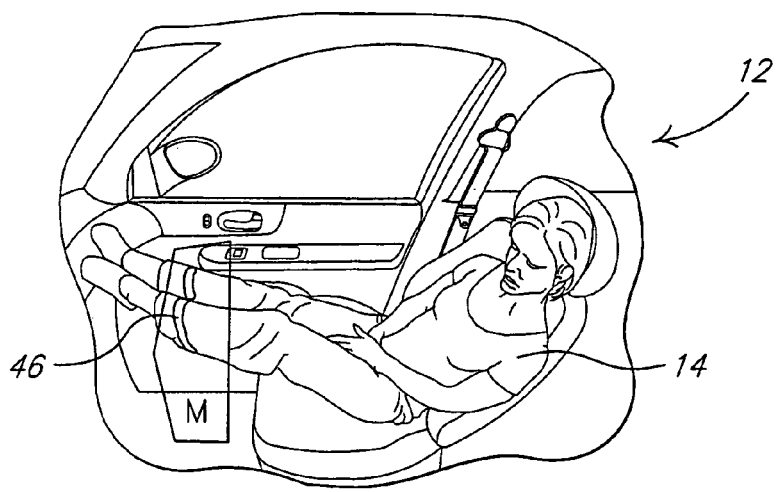
FIG. 11 illustrates an example of mask region used in calculations for automatic exposure control of a camera by the image preprocessing process.

Referring to FIG. 10, the image preprocessing process 1000 begins with step (1002) by initializing the exposure time of the camera 26. The exposure time is initially adapted so that the image pixels corresponding to the profile 46 will have a value that is substantially greater than the noise threshold of the camera 26. In steps (1004), and (1006), a $k^{th}$ image of the background is sampled by the camera 26 with the light curtain 22 OFF. In step (1008), the $k^{th}$ image of the background is analyzed within a mask region M, e.g. as illustrated in FIG. 11, to determine the percentage of points within a mask region M having corresponding pixel values that are greater than a threshold value, for purposes of determining whether the exposure time of the camera 26 needs to be reduced so as to prevent the camera 26 from be saturated by ambient light, e.g. sunlight. So long as a given set of pixels across the profile 46 is not saturated by a sufficient margin, with the light curtain OFF, then the hereinbelow described binning technique will be able to recover the profile 46 in the preprocessed image, so that the profile 46 can be used for purposes of occupant detection.

Figure 12:
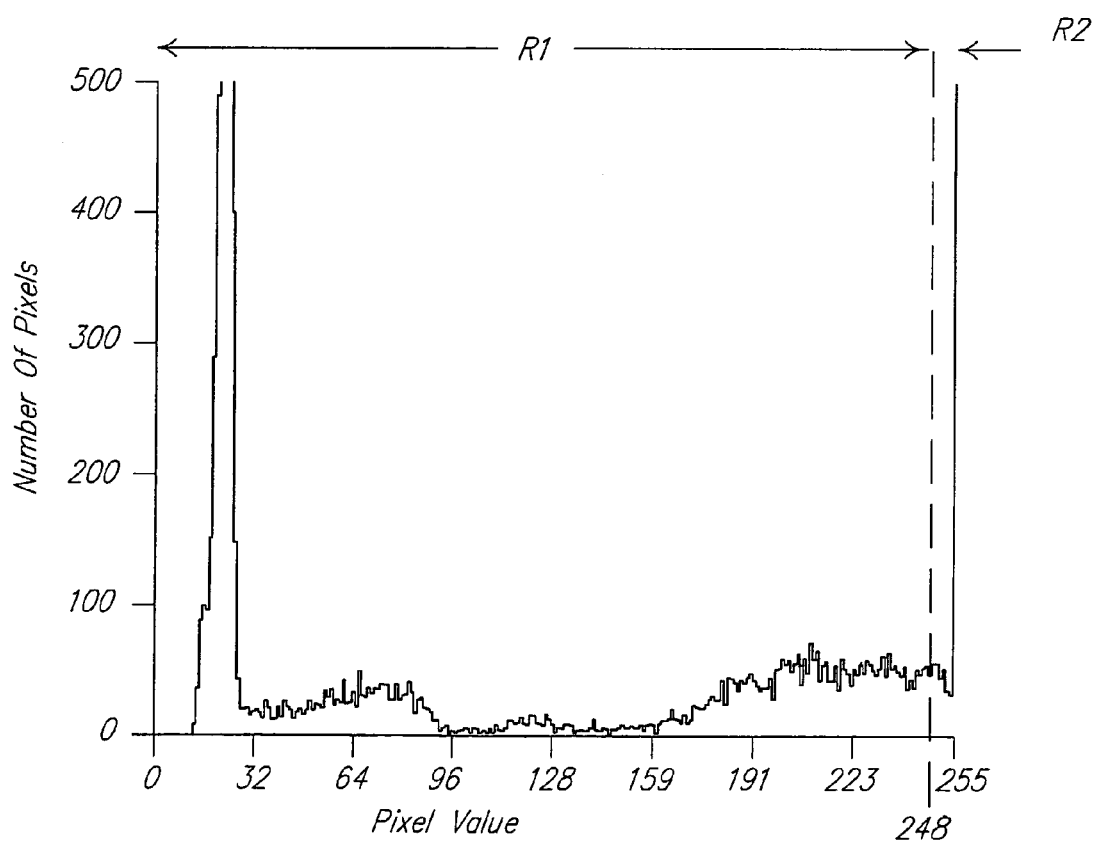
FIG. 12 illustrates an example of a histogram of the mask region used for automatic exposure control of the camera.

The mask region M is adapted to surround the region in the image wherein at least a portion of the image of the profile 46 would be expected to be located. The value of each pixel in the image from the camera 26 is represented, for example, by an 8-bit number that ranges from 0 to 255. FIG. 12 illustrates an example of a histogram of the pixel values for pixels within the mask region M for an image with the light curtain 22 OFF, wherein for each of the 256 different possible pixel values, the number of pixels of that value within the mask region M of is plotted as a function of pixel value in an associated histogram. In step (1010), if a threshold percentage—e.g. 2%—of pixels having a value greater than a threshold pixel value—e.g. 248,—indicating a relatively high level of ambient lighting, e.g. from sunlight as illustrated in FIG. 11, then in step (1012) the exposure time of the camera 26 is reduced—e.g. by a factor,—and the process repeats with step (1004). For example, the threshold pixel value is adapted to be lower than the maximum pixel value by an amount equal to at least the noise threshold of the camera 26, e.g. 6–8 pixels. Notwithstanding that FIG. 11 illustrates an image from the camera 26 with the light curtain 22 ON for purposes of illustrating the placement of the mask region M, the determination in step (1010) is made with the light curtain 22 OFF. Furthermore, notwithstanding that step (1008) and FIG. 12 illustrate the use of a histogram, it should be understood that the determination in steps (1008) and (1010) of whether or not to reduce the camera exposure time is equivalent to the determination of whether or not the total number of pixels having pixel values exceeding the threshold pixel value, exceeds a threshold number of pixels corresponding to the threshold percentage, because the total number of pixels in mask region M is fixed.

Following step (1010) if the exposure time is correct, in steps (1014) and (1016), a $(k+1)^{th}$ image is sampled by the camera 26 with the light curtain 22 ON, wherein k and k+1 respectively identify any two consecutive images. In step (1018), if the maximum pixel value in the difference image is less than a threshold value, then in step (1020), a flag is set that will cause the exposure time of the camera 26 to be increased in step (1002) when the next image is sampled. Accordingly, whereas step (1012) provides for reducing the exposure time responsive to high ambient lighting, e.g. from sunlight, step (1020) provides for subsequently increasing the exposure time responsive to a subsequent decrease in ambient lighting, e.g. when driving on a sunny day from an open road into a tunnel. The maximum pixel value in step (1018) would typically correspond to a pixel within the profile 46.

The imaging system acts to detect the light reflected or scattered from profile 46. The process of detecting the reflected or scattered light, or distinguishing this light from the associated ambient lighting, can be difficult under conditions of high ambient lighting, for example, because of ambient sunlight conditions. The signal of the reflected or scattered light from the light curtain may be distinguished from the noise of the associated ambient lighting by subtracting an image with the light curtain 22 OFF (i.e. a background image), from an image with the light curtain 22 ON, so as to substantially cancel the image components that are common to both images, i.e. image components that are relatively static with respect to the camera 26 or light curtain 22 for consecutive images. The differencing operation substantially eliminates portions of the signal that are common to the ON and OFF images, including the common-mode signal of relatively high brightness that would result from illumination by direct sunlight. The signal in the difference image is substantially close to zero everywhere except the region on which the beam is projected. In an exemplary system, images of 2 milliseconds duration are successively captured, alternately with the light source 20 ON and the light source 20 OFF. Successive images are subtracted from one another to form an associated difference image, which is then used to detect those pixels corresponding to the image of the light curtain 22 upon—and therefor intersecting with—either the interior of the vehicle, an occupant 14 or object, or a portion thereof.

Accordingly, following either steps (1018) or (1020), in step (1022), a difference image is formed by subtracting the $k^{th}$ image from the $(k+1)^{th}$ image so as to cancel the background signal common to both images, leaving an image of the light from the profile 46 of the light curtain 22 that is reflected or scattered by surfaces that intersect therewith. The subtractive imaging process cancels the common mode signal, so that the signal-to-noise ratio of the difference image is higher than that of the image with the light curtain 22 ON.

It should be understood that steps (1014) through (1020) could be performed before steps (1004) through (1012), although the previously-described order provides for reduced latency because the information about penetration of the avoidance zone 16 is in the image with the light curtain 22 ON, which is acquired last, i.e. most recent. Generally, the difference image is formed by subtracting the image with the light curtain 22 OFF from the image with the light curtain 22 ON.

Figure 13:
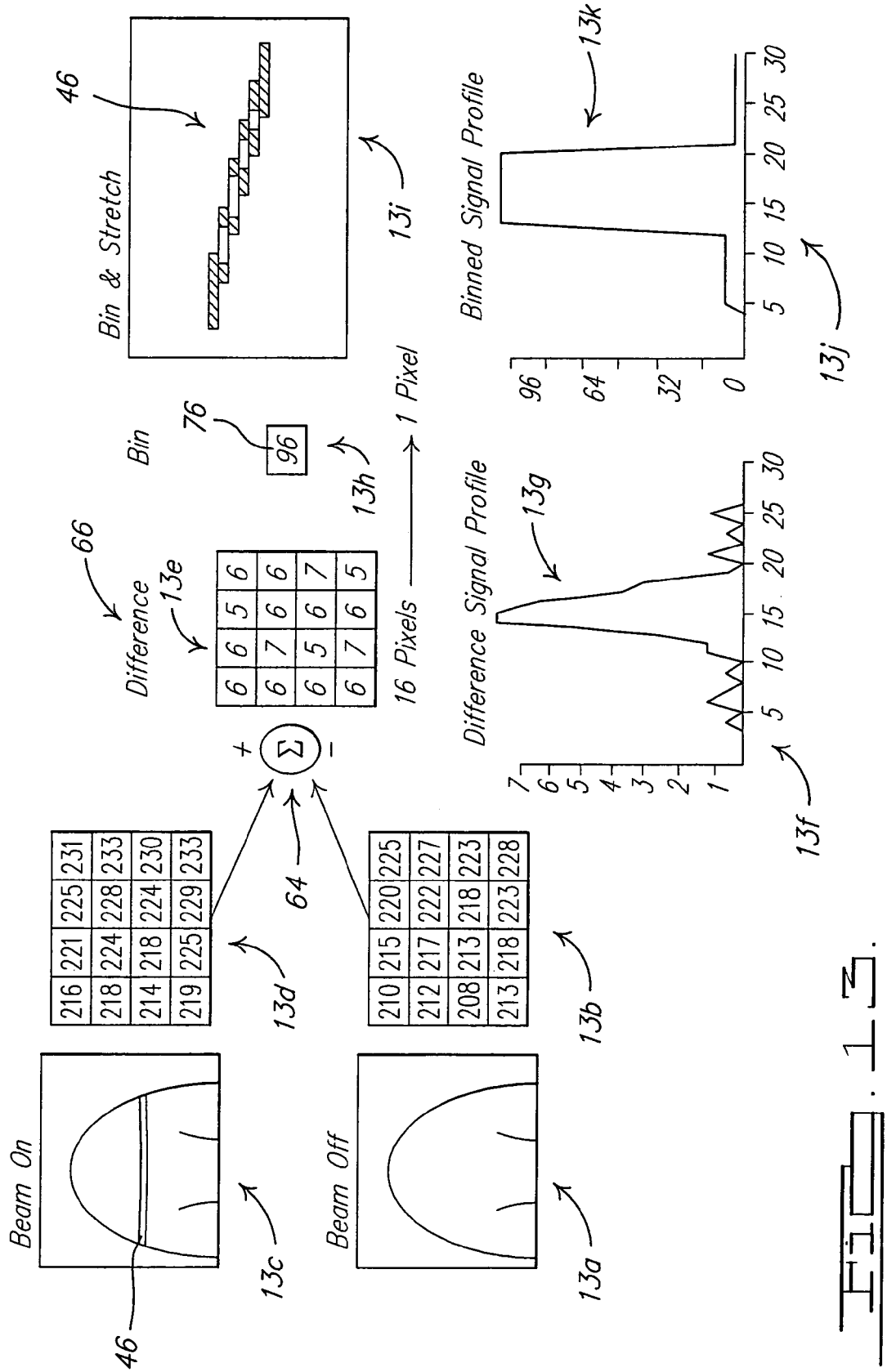
FIG. 13 illustrates an example of an image differencing process and an image binning process, of the image preprocessing process.

In accordance with one technique of subtractive image processing, a difference image is formed after each new set of consecutive images are captured, so that difference images are formed at half the rate at which images are acquired by the camera 26, as follows, wherein ON indicates an image signal with the light curtain 22 ON, and OFF indicates an image signal with the light curtain 22 OFF:

Difference Image 1=Image 1: light curtain ON−Image 2: light curtain OFF
Difference Image 2=Image 3: light curtain ON−Image 4: light curtain OFF
Difference Image 3=Image 5: light curtain ON−Image 6: light curtain OFF In the above process there is an inherent latency of one sampling period before the difference image is affected by information from the image with the light curtain 22 ON. This latency may be eliminated by updating the difference image after the image with the light curtain 22 ON is captured,—rather than after the image with the light curtain 22 OFF is captured—as follows:

Difference Image 1=Image 2: light curtain ON−Image 1: light curtain OFF
Difference Image 2=Image 4: light curtain ON−Image 3: light curtain OFF
Difference Image 3=Inage 6: light curtain ON−Image 3: light curtain OFF The process of detecting an occupant 14 penetrating the light curtain 22 may be improved under dynamic conditions by forming a new difference image after each new image acquired rather than after a pair of consecutive images are acquired—the number of difference images formed being one less than the total number of images acquired—as follows:

Difference Image 1=Image 1: light curtain ON−Image 2: light curtain OFF
Difference Image 2=Image 3: light curtain ON−Image 2: light curtain OFF
Difference Image 3=Image 3: light curtain ON−Image 4: light curtain OFF Referring to FIG. 13, the subtractive imaging process is illustrated for a relatively high level of ambient lighting. In a 4×4 array of 16 pixels in a region of the image that includes the profile 46, in a first image 13*a* with the light curtain 22 OFF, the pixel values in the array 13*b* range from 208 to 228 units; and in a second image 13*c* with the light curtain 22 ON, the pixel values in the array 13*d* range from 214 to 233 units. The corresponding array 13*e* of pixels in the difference image has pixel values ranging from 5 to 7 units. Accordingly, in the region where the light curtain 22 is projected, the count level for an 8-bit difference signal can be relatively small. A cross-section 13*f* in the difference image through the profile 46 of the light curtain 22 illustrates a pulse-shaped feature 13*g* corresponding to the profile 46, having a peak of about 8 units.

Referring again to FIG. 10, in step (1024), the signal in the difference image is boosted by a binning process, wherein the values of all pixels within a given array are summed to produce a single value representative of that array, the size of which is referred to as a binning factor. The binning operation spatially integrates and compresses the signal of the difference image. For example, binning factors of 2×2, 4×4 and 8×8 regions have been used. Furthermore, the binning factor may be adaptively controlled responsive to the characteristics of either the difference image or the resulting binned image, for example, so that the range of values in the binned image span a threshold value. Generally, in the binning process, regions of size n×n are identified in the difference image and then summed together to form a much smaller image. The resulting binned image may then expanded to its original size, or the subsequent processing may be adapted to the binned space, which is compressed relative to the difference image space. Although the binning operation reduces image resolution, it is very effective in recovering relatively low illumination levels in the presence of high ambient sunlight levels. For example, using 8×8 binning, the profile 46 can be recovered even when its irradiance is as low as 3% of the background sunlight level within the wavelength band of interest. For example, a 1.5 count average difference between pixels of the image of the profile 46 for ON and OFF images can produce a corresponding 8×8 binned pixel having a pixel value of 96 counts (out of 255). For purposes of illustration, in order to achieve the same signal levels in a system without binning, the light curtain 22 would need to have substantially more irradiance—which could affect eye safety—and/or the exposure time of the camera 26 would need to be increased—which could cause saturation of the camera 26 under conditions of high ambient lighting.

Referring to again to FIG. 13, a binning process using a 4×4 binning factor is illustrated, wherein the 4×4 array 13*e* in the difference image is summed to produce a corresponding bin value 13*h* of 96. The bin values are then stretched over the original image space so as to form a binned image 13*i*. A cross-section 13*j* in the binned image 13*i* through the profile 46 of the light curtain 22 illustrates a pulse-shaped feature 13*k* corresponding to the profile 46, having a peak of about 100 units, which is over 8 times greater than the corresponding peak in the difference image. For a difference image with pixel values that are as low as 6 counts on average, a 4×4 binning provides a summed signal of 96 counts on average. The binning process is adapted to operate on non-overlapping arrays of pixels. A convolution process—wherein the difference image is convolved with a unity amplitude rectangular pulse function—would provide for a similar amplification of the difference signal, but would be slower.

Referring again to FIG. 10, the binned image is then binarized in step (1014) at an appropriate threshold within the dynamic range of the camera 26, whereby pixels having a brightness value less than a threshold are set to a value of zero, and pixels having a brightness value greater than a threshold are set to a value of unity, so as to generate an associated binary binned image signal 51.

A Field Programmable Gate Array (FPGA) may be adapted to perform the hereinabove described differencing (1022), binning (1024), and binarization (1026) operations so as to reduce the computational load on the microprocessor of the image processor 48, the processing time, the electronic package size, the associated power consumption, and the per unit cost. Processing time can be reduced in comparison with a software implementation on a microprocessor, because parallel arithmetic operations tailored to the image differencing and binning process can be realized in hardware using the FPGA. The FPGA is custom designed and sized for the process, providing for reducint size, power consumption and per unit cost, precluding the need for superfluous circuitry that would otherwise be needed to support general purpose signal processing. Using FPGA gates for temporary image data storage instead of a separate RAM integrated circuit further reduces part count. The FPGA can also be used to control a CMOS camera 26 without an external memory chip or support circuitry. Furthermore, the FPGA may be implemented in an Application Specific Integrated Circuit (ASIC) when the production volume justifies the non-recoverable engineering (NRE) cost associated with an ASIC.

Figure 14:
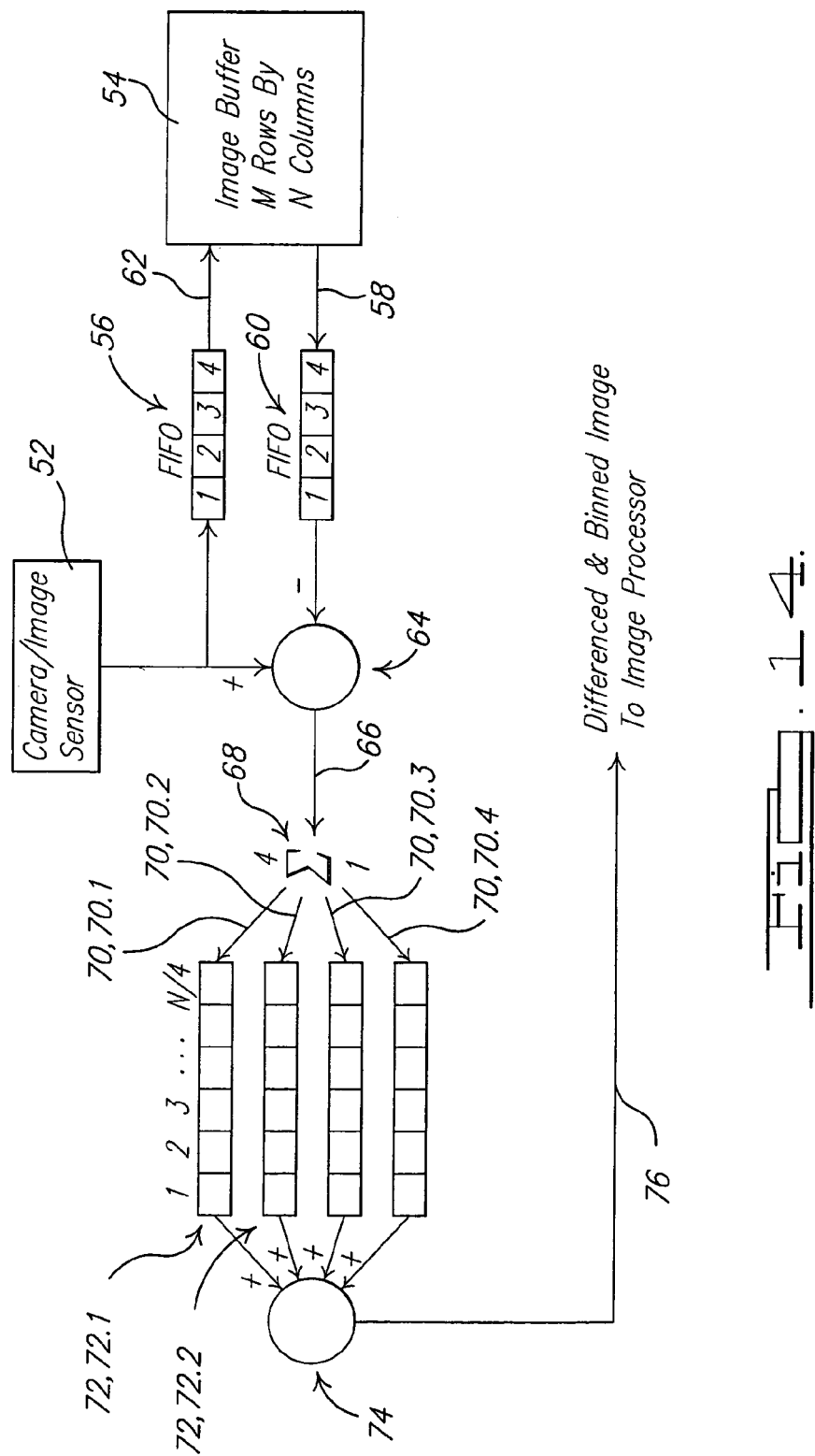
FIG. 14 illustrates an example of a methodology of the image differencing process and the image binning process.

Referring to FIG. 14, there is illustrated an exemplary processing algorithm that can be used to implement the differencing and binning processes in a FPGA using a substantially minimum number of gates therein, wherein the binning process is illustrated with a 4×4 binning factor. The image signal from the image sensor 52 of the camera 26 is stored in an image buffer 54 through a first FIFO (first in-first out) buffer 56. At the beginning of any given imaging cycle, e.g. either steps (1006) or (1016) of FIG. 10, the image buffer 54 will contain a complete image from the previous cycle. For example, at the beginning of step (1006), the imaging buffer 54 will contain an image with the light curtain 22 ON, and at the beginning of step (1016), the imaging buffer 54 will contain a corresponding image with the light curtain 22 OFF. Accordingly, commencing with step (1016) of the imaging process, the imaging buffer 54 will have stored therein an image with the light curtain 22 OFF, and the image data from the image sensor 52 will be of a scene with the light curtain 22 ON, and the image sensor 52 will be providing—pixel by pixel—an image with the light curtain 22 ON. For a given pixel location, an old pixel value 58 is loaded into a second FIFO buffer 60 from the imaging buffer 54, and the corresponding new pixel value 62 is then loaded from the image sensor 52 through the first FIFO buffer 56 into the corresponding location of the imaging buffer 54. The old pixel value 58 is subtracted from the new pixel value 62 at a summing junction 64 so as to form a difference pixel value 66, and a successive number—e.g. four—of difference pixel values 66 are added together in an accumulator 68, wherein the successive number that are added is given by the binning factor. The value of the accumulator 68 is reset to zero after each group of difference pixel values 66 is accumulated. The accumulator 68 outputs a column-binned value 70 for each set of difference pixel values 66 from a particular row of the difference image. A first row of column-binned values 70.1, corresponding to the first row of the difference image, is stored in a first row buffer 72.1. After the first row of the image is processed, a second row of column-binned values 70.2, corresponding to the second row of the difference image, is stored in a second row buffer 72.2. This process continues in succession until the $4^{th}$ row of column-binned values 70.4 for a 4×4 binning factor (or generally, the $K^{th}$ row for a KxK binning factor), whereupon corresponding column-binned values 70.1, 70.2, 70.3 and 70.4 are added together by an adder 74, so as to calculated the corresponding binned values 76 for the first four rows of the image. After the first four (or generally K) rows are processed, the above described process continues with the next four (or generally K) rows, and so on, until all of the rows in the image are binned. Alternately, a single row buffer 72 could be used instead of separate row buffers 72.1, 72.2, etc., wherein the first row of column-binned values 70.1 are first stored in the row buffer 72, and subsequent column-binned values 70.2, 70.3 and 70.4 are added thereto, thereby producing the final binned values 76 after the final column-binned values 70.4 are processed.

Figure 15A:
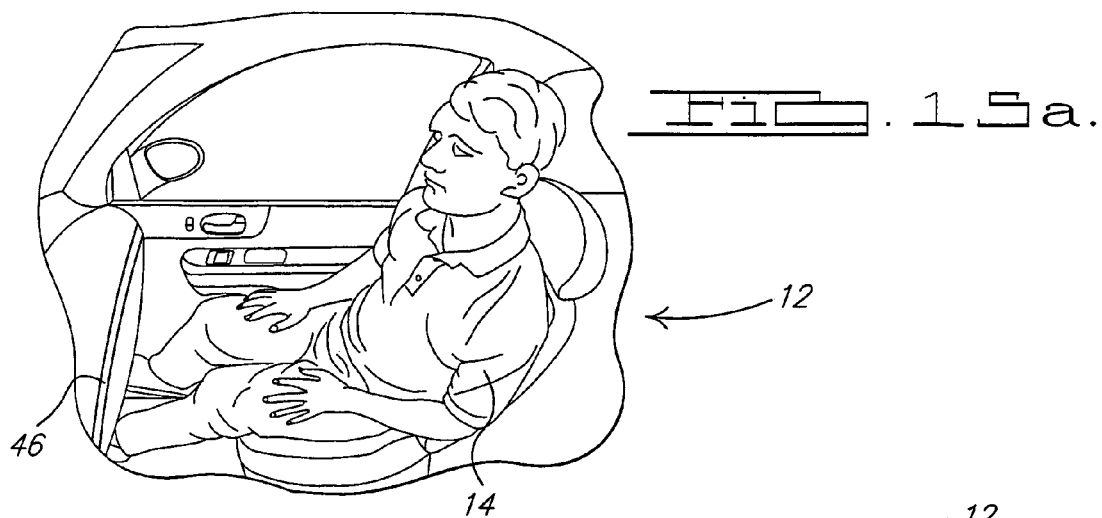
FIG. 15a illustrates an image of a light curtain when the light curtain is not penetrated by an occupant.
Figure 15B:
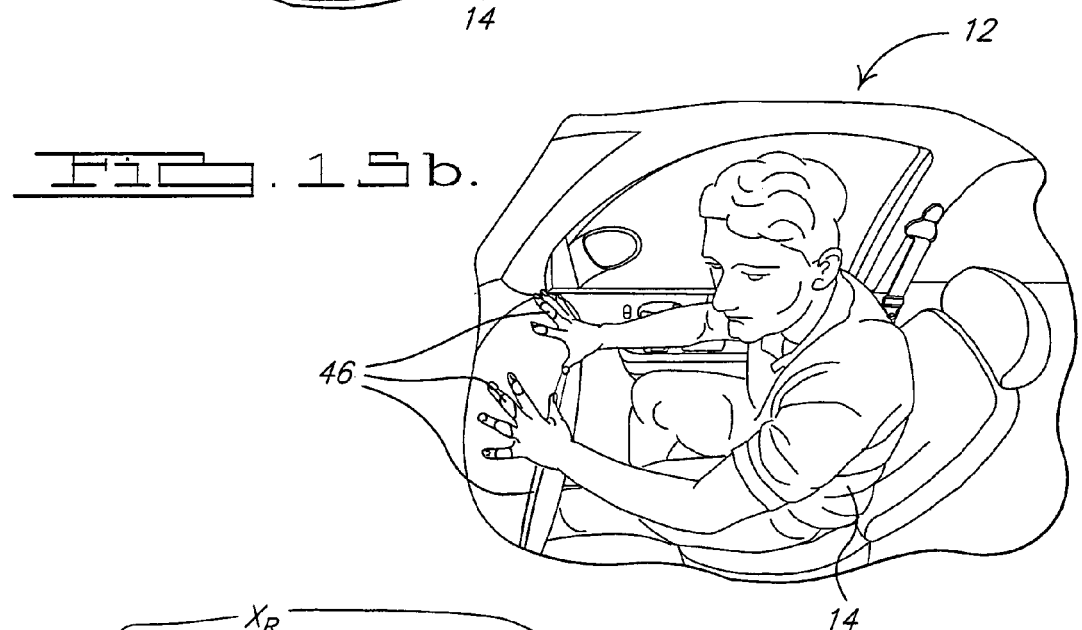
FIG. 15b illustrates an image of a light curtain when the light curtain is penetrated by an occupant, wherein the location of the penetration is proximate to an avoidance zone.
Figure 23A:
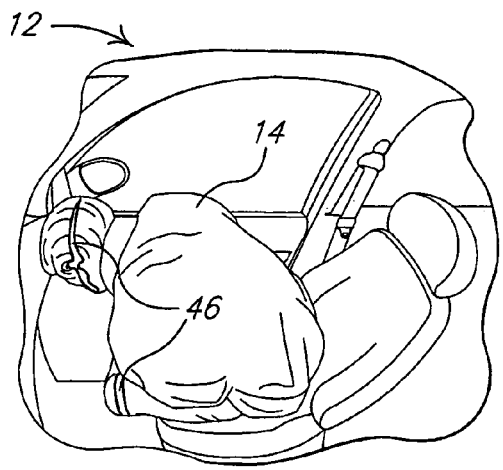
FIG. 23a illustrates an image of an occupant whose head is touching an instrument panel so as to intersect a light curtain, as an example of a second class of objects.

Referring again to FIGS. 1 and 2, the actuation of the air bag inflator 18 is controlled by a signal comprising a logical AND combination—e.g. by an AND gate 78—of a first signal from a crash sensor 80 and a second signal from the image processor 48. If there is no occupant 14 penetrating the avoidance zone 16, e.g. as illustrated in FIG. 15a, or if the penetration of the avoidance zone 16 does not correspond to an out-of-position occupant at risk of injury by the deployment of the air bag inflator 18, e.g. as illustrated in FIG. 15b, then the second signal from the image processor 48 enables the first signal from the crash sensor 80 to control the actuation of the air bag inflator 18 responsive to a crash. Otherwise, if the light curtain 22 is penetrated by an occupant 14, and the profile 46 viewed by the camera 26 corresponds to an occupant 14 positioned so as to be at risk of injury by the deployment of the air bag inflator 18, e.g. as illustrated in FIG. 23a, then the image processor 48 generates a second signal that disables a potential actuation of the air bag inflator 18 by the crash sensor 80.

The light curtain 22 and camera 26 are, for example, adapted so that with increasing height within the vehicle (–Z) of the penetration point, the corresponding captured image of the penetration point moves leftward and upward, e.g. as illustrated in FIG. 15b. If the light curtain 22 falls entirely on the floor or if the light curtain 22 is only intersected by the occupant's knees—both examples of heights of penetration that would be below the corresponding avoidance zone 16,—then the air bag inflator 18 would remain enabled because the height (Z) position within the vehicle 12 of the penetration point(s) calculated from the image signal would indicate that the penetration of the light curtain did not occur within the avoidance zone 16. Generally, the arrangement of the light curtain 22 and the camera 26 enable detection of the (X, Y, Z) coordinates of the points of intersection where an object penetrates the light curtain 22.

In an exemplary system, the camera 26 is positioned along the centerline of the vehicle 12 several inches rearward of the intersection of the headliner and the windshield. For example, this location provided, for a particular vehicle, the following benefits: 1) a view of the vehicle's passenger compartment that had a sufficient, if not substantially optimal, view of the avoidance zone 16, 2) a location for which the camera 26 encounters little, if any, direct sunlight, and 3) a field-of-view for the camera 26 that was substantially not occluded by a sun visor.

The light source 20 is, for example, several inches forward and several inches downward of the camera 26 position, and is positioned so that the projected light curtain 22 forms the rearward boundary 82 of the avoidance zone 16. The accuracy of the detection algorithm generally improves as the offset between the light source 20 and the camera 26 is increased.

The particular offset between the light source 20 and the camera 26 is affected by a number of considerations, for example, accuracy, field of view, and packaging. For example, whereas it is possible to select the offset between the light source 20 and the camera 26 so as to minimize the affect of angular and offset misalignments on the calculation of position for a particular point within the avoidance zone 16. Selecting the point with the largest position error (within the avoidance zone) as the "optimization" point may result in large increases in error at other points that would otherwise satisfy a particular accuracy criteria, e.g. ±12.5 millimeters. Furthermore, the selection of a particular offset distance can be affected by other criteria, e.g. production costs, ease of installation, size, etc. For example, mounting both the camera 26 and the light source 20 on a single, relatively small structure improves packaging within the vehicle 12, reduces associated cost, and provides for better control of associated translational and rotational misalignments, relative to a system for which the camera 26 and light source 20 are housed in separate structures. Furthermore, for a light source 20 aligned to provide for a substantially vertical light curtain 22—i.e. in a plane parallel to one axis, e.g. the Z-axis—the associated position computations of the occupant detection system 10 are substantially independent of the camera 26/light source 20 offsets along the other two axes, thereby substantially eliminating two error sources, which helps to reduce associated production costs. Analysis of the error sources and their affect on the accuracy of the three-dimensional position calculations has shown that in a system with a 4 inch offset between camera 26 and light source 20 in a particular vehicle, the associated calculated position error will be within ±12.5 millimeters over the entire avoidance zone 16 if the associated offset distance is within ±1.25 millimeters, and the associated angular rotation of the camera 26 relative to the light source 20 is within ±0.06 degrees.

Figure 16A:
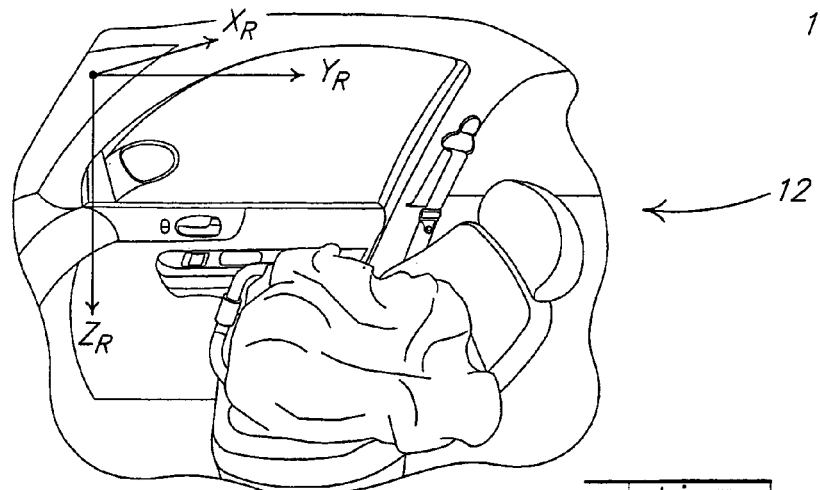
FIG. 16a illustrates a coordinate system for an occupant detection system.
Figure 18B:
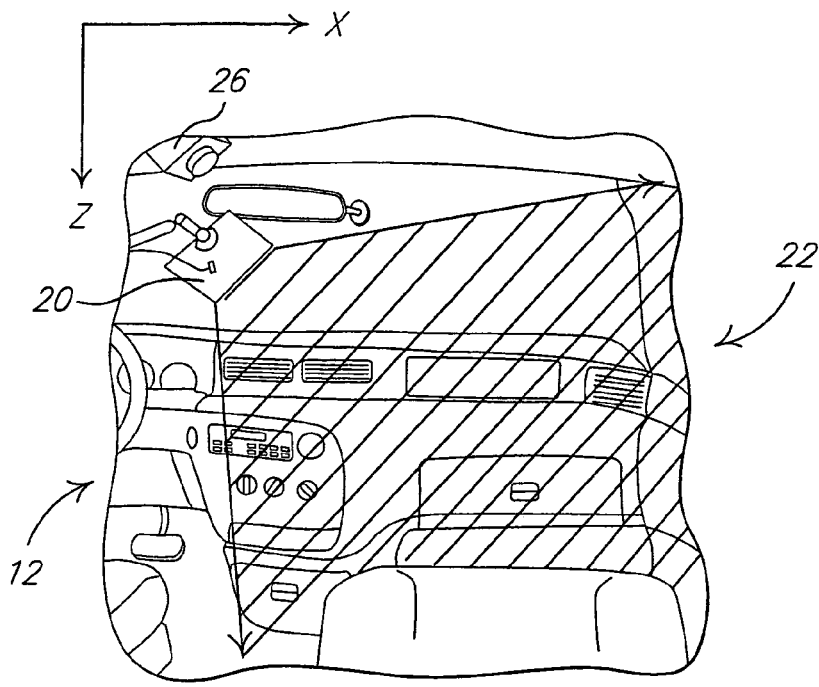
FIG. 18 illustrates an intersection of a light curtain with the knees of an occupant.
Figure 18C:
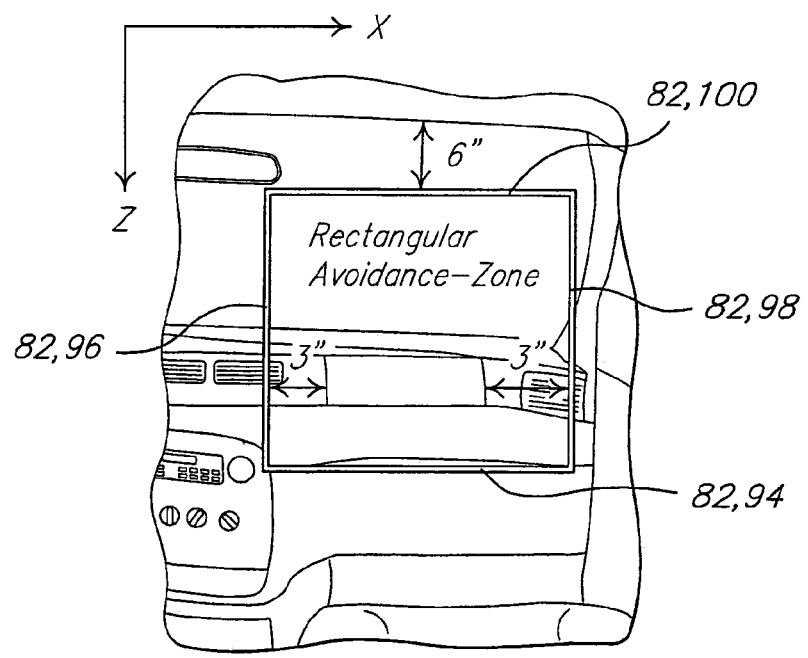

Given the position and orientation of both the camera 26 and light source 20 within the vehicle, a planar airbag avoidance zone 16 of arbitrary shape can be constructed within the vehicle. FIG. 16a illustrates a Cartesian coordinate system centered about the light source 20, and FIG. 16b illustrates a substantially vertical light curtain 22—i.e. substantially parallel with the X-Z plane—generated by the light source 20. The illumination plane is illustrated at a fixed Y distance from the airbag. Given the geometry of the light curtain 22 and the camera 26, the location of a point of penetration of the light curtain 22 within the field-of-view of the camera 26 can be calculated from the location of that point in the corresponding image from the camera 26. Accordingly, an avoidance zone 16 of arbitrary shape may be defined by the associated collection of points along the avoidance zone boundary 82 at the intersection of the avoidance zone 16 with the light curtain 22, as is illustrated in FIG. 16c for a rectangular shaped avoidance zone boundary 82. Other avoidance zone boundary 82 shapes can also be used, e.g. square, circular, elliptical or any arbitrary shape.

If the position and angular rotations of both the camera 26 and light source 20 with respect to the reference axes are known, both the three dimensional position of an object penetrating the light curtain 22 and the image plane contour corresponding to an particular avoidance zone boundary 82 can be calculated in accordance with a methodology described hereinbelow.

For a planar light curtain 22, the plane of the light curtain 22 in the three dimensional reference system is given by:

$$(x-a)\cdot\cos(\beta)+(y-b)\cdot\cos(\alpha)\cdot\sin(\beta)+(z-c)\cdot\sin(\alpha)\cdot\cos(\beta)=0 \quad (1)$$

where a, b and c are the translational offsets of the illuminator with respect to the point of origin of the reference coordinate system along the X, Y and Z axes respectively; and a and $\beta$ are the elevation and azimuth angles respectively, of the light source 20 relative to the reference coordinate system.

Light received by the camera 26 is imaged onto a focal plane array (FPA) imaging sensor therein, which provides a pixelated image—in a corresponding two-dimensional pixel space 84 having associated camera coordinates—of an object as seen by the camera 26. Energy reflected from an object penetrating the light curtain 22 is imaged by the camera lens 28 and illuminates corresponding pixels of the FPA. The direction cosines $i_c$, $j_c$ and $k_c$—expressed in camera coordinates—of each illuminated pixel are given by:

$$i_c = \cos(\delta) \cdot h \quad (2.1)$$

$$j_c = [i_c^2 + k_c^2]^{1/2} \quad (2.2)$$

$$k_c = \sin(\delta) \cdot h \quad (2.3)$$

wherein h is given by:

$$h = [\sin^2\{(m^2+n^2)^{1/2} \cdot \psi/(2 \cdot m_{max})\}]^{1/2} \quad (3)$$

where $\psi$=camera field of view (FOV), m and n are the horizontal and vertical positions of the illuminated pixel; and $\delta$ are given by:

$$\delta = \tan^{-1}(n/m) \quad (4)$$

The direction cosines $i_c$, $j_c$ and $k_c$ constitute components of an associated direction cosine vector, which can be transformed from the camera coordinate system to the reference coordinate system by a rotational transformation as follows:

$$\begin{bmatrix} i_r \\ j_r \\ k_r \end{bmatrix} = \begin{bmatrix} \cos(\theta) & -\sin(\theta)\cdot\cos(\phi) & \sin(\theta)\cdot\sin(\phi) \\ \sin(\theta) & \cos(\theta)\cdot\cos(\phi) & -\cos(\theta)\cdot\sin(\phi) \\ 0 & \sin(\phi) & \cos(\phi) \end{bmatrix} \cdot \begin{bmatrix} i_c \\ j_c \\ k_c \end{bmatrix} \quad (5)$$

wherein $\theta$ and $\phi$ are the azimuth and elevation angles of the camera 26.

The components of a vector $[x_p, y_p, z_p]$, of length l, from the origin of the reference coordinate system to the point ($x_p$, $y_p$, $z_p$) in object space 86 on the light curtain 22 that corresponds to the illuminated pixel is given by:

$$x_p = l \cdot i_r \quad (6.1)$$

$$y_p = l \cdot j_r \quad (6.2)$$

$$z_p = l \cdot k_r \quad (6.3)$$

The three-dimensional position(s) of the object that has penetrated the light curtain 22 can then be obtained by 1) substituting equations (6.1–6.3) for $x_p$, $y_p$ and $z_p$ into equation (1); 2) solving for l; and 3) substituting the value of l in equations (6.1–6.3), for each one or more associated points of the object that are illuminated by—and which therefore penetrate—the light curtain 22.

Given $x_p$, $y_p$ and $z_p$ of any point that lies in the illuminator plane, it is possible to compute the position of the illuminated pixel within the FPA plane—i.e. the associated camera coordinates in the two-dimensional pixel space 84—by reversing the above-described steps. Accordingly, an avoidance zone 16 of any arbitrary shape in object space —i.e. on the light curtain 22—can be mapped onto an equivalent pixel contour lying on the camera FPA, i.e. two-dimensional pixel space 84.

Figure 17A:
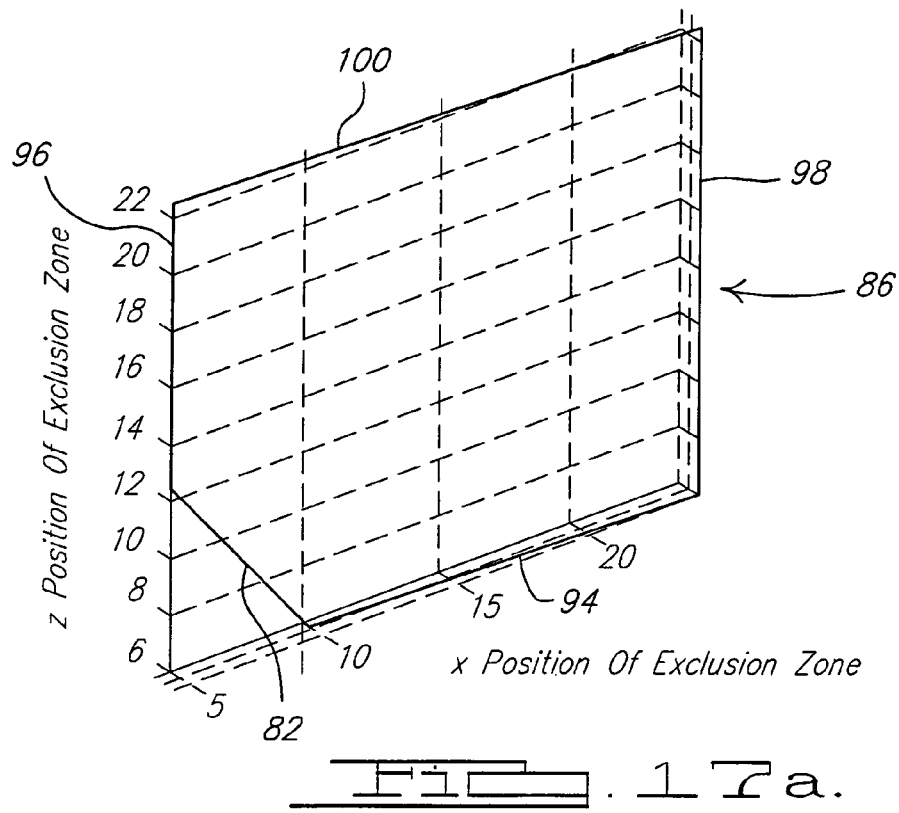
FIG. 17a illustrates an oblique view of an avoidance zone boundary.
Figure 17B:
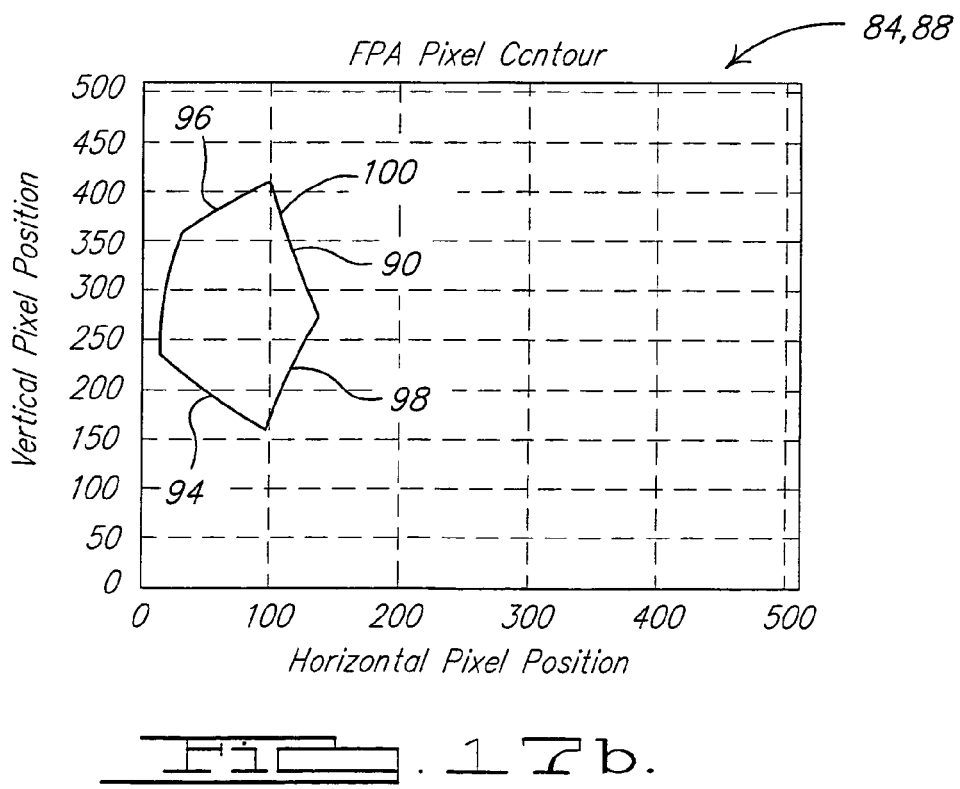
FIG. 17b illustrates a pixel contour corresponding to an image of the penetration of the avoidance zone by an object, for a first imaging system geometry and a first field of view of the camera.

Referring to FIG. 17a, the avoidance zone boundary 82 is shown in the three-dimensional object space 86 of the light curtain 22, wherein the X and Z coordinate axes are parallel to the surface of the light curtain, and the range of Y coordinates shown in FIG. 17a illustrates the thickness of the light curtain 22. Referring to FIG. 17b, the image 88 from the camera 26 of the avoidance zone boundary 82 is shown in the associated two-dimensional pixel space 84 of the focal plane array (FPA) sensor of the camera 26. Accordingly, the three-dimensional avoidance zone boundary 82 in object space maps into an associated 2-dimensional pixel contour 90, which is illustrated in FIG. 17b for the example of a first imaging system geometry, and a first field of view of the camera 26. In accordance with the first imaging system geometry, the azimuth and elevation of the camera 26 was about −87 degrees and 40 degrees respectively, the azimuth and elevation of the light source 20 was about −93 degrees and 0 degrees respectively, and the (X, Y, Z) offset of the light source 20 relative to the camera 26 was about (−102, −369 and 64) millimeters. Furthermore, the first field of view was about 116 degrees. The pixel contour 90 of the avoidance zone boundary 82 has a one-to-one correspondence with the avoidance zone boundary 82 in object space, although the shape of the pixel contour 90 in FIG. 17b appears to be distorted from that of the avoidance zone boundary 82 in FIG. 17a because of the orientation of the camera 26 relative to the light curtain 22. In the image space of FIG. 17b, the left side of the pixel contour 90 is near the edge of the two-dimensional pixel space 84, so that a decrease in the field of view of the camera 26 of only 4° would cause a portion of the avoidance zone 16 boundary 82 to lie outside the two-dimensional pixel space 84.

Figure 17C:
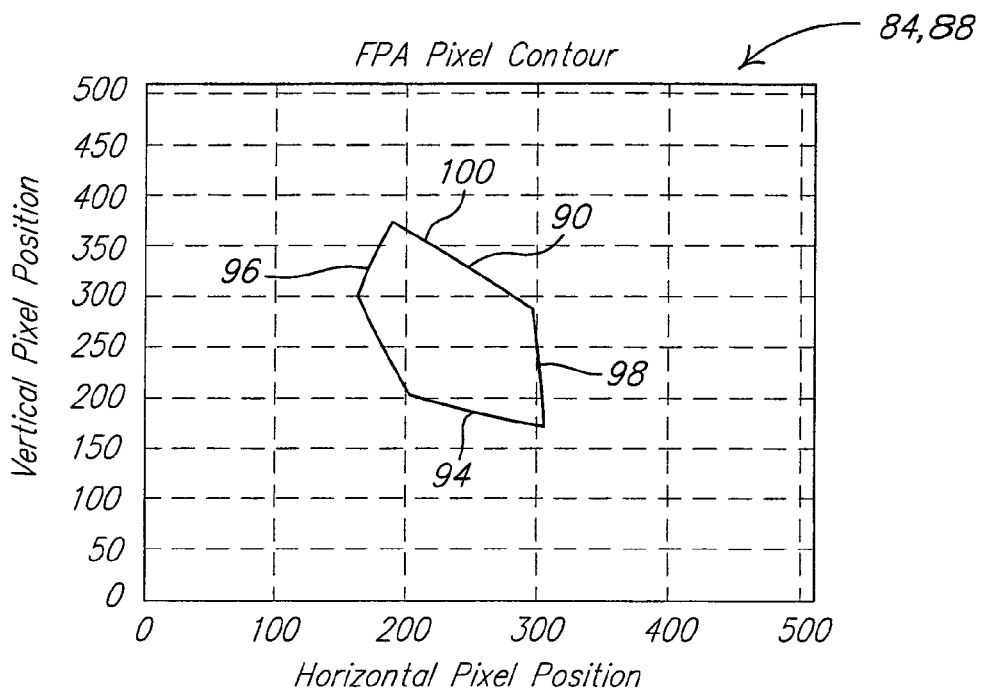
FIG. 17c illustrates a pixel contour corresponding to the image of FIG. 17b, but for a second imaging system geometry.

Referring to FIG. 17c, the angular rotation of the camera 26 is adapted in accordance with a second imaging system geometry—for the same first field of view as for FIG. 17b—so that the center pixel of the two-dimensional pixel space 84 corresponds to the geometric center of the avoidance zone boundary 82—which is not exactly the same as aligning the center of the pixel contour 90 with the center pixel of the two-dimensional pixel space 84. The difference between the first and second imaging system geometries is that the azimuth and elevation of the camera 26 was about −133 degrees and 32 degrees respectively for the second imaging system geometry. In the image 88 of FIG. 17c, the area of the pixel contour 90 is approximately 15% of the total area of the two-dimensional pixel space 84.

Figure 17D:
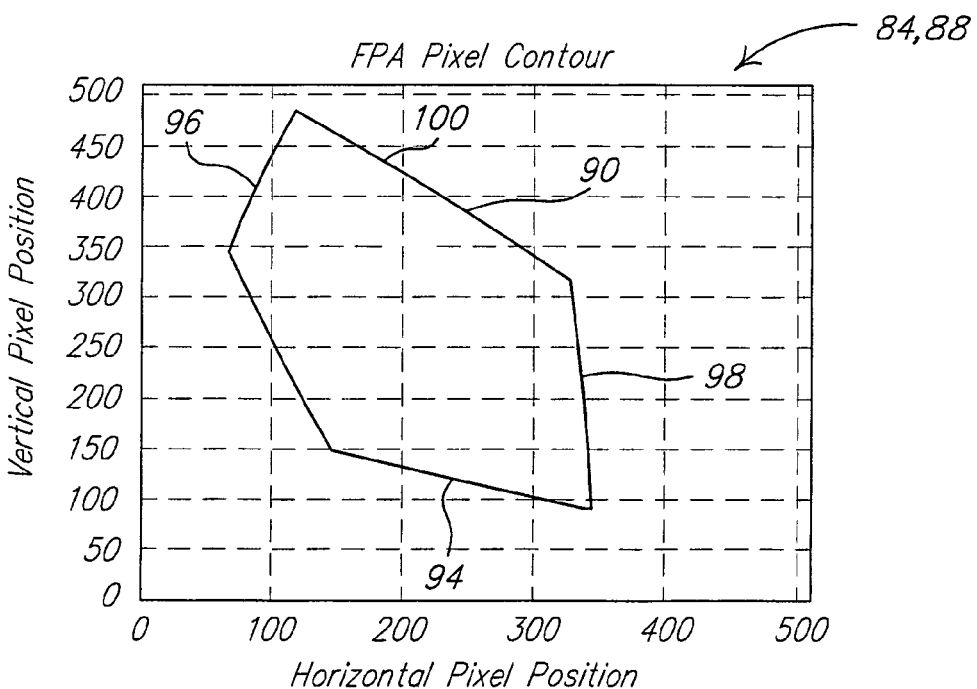
FIG. 17d illustrates a pixel contour corresponding to the image of FIG. 17c, but for a second field of view of the camera, wherein the second field of view is less than the first field of view.

Referring to FIG. 17d, this area can be expanded by reducing the field of view of the camera 26, e.g. to about 60 degrees, or by about a half of the first field of view, so as to provide for enhanced detection and recognition of objects such as heads, hands, etc, while maintaining the image of the avoidance zone boundary 82 within the two-dimensional pixel space 84, resulting in an approximately fourfold increase in area of the pixel contour 90.

The accuracy by which penetration of the light curtain 22 may be detected is responsive to the corresponding accuracy of the associated model of the avoidance zone 16. Due to the position and angle of the light curtain 22, objects penetrating the light curtain 22 at higher elevations have a proportionally larger offset with respect to the right edge of the camera 26 image plane. For this reason, it is beneficial to establish an intersection of the light curtain 22 with the maximum safe height of an occupant's knees; which serves as the lower boundary of the avoidance zone 16. Penetrations of the light curtain 22 into the avoidance zone 16 are detected as column-wise shifts with respect to this lower boundary.

Figure 18:
Figure 19:
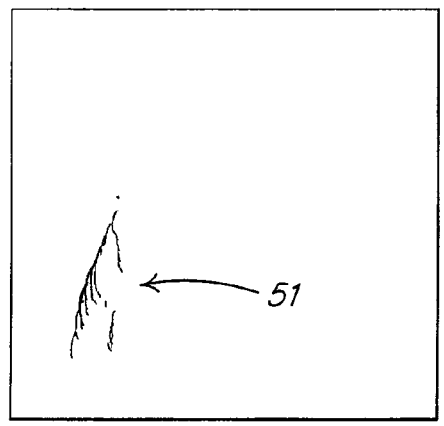
FIG. 19 illustrates a plurality of binary binned image signals superimposed for various knee locations, one of which is illustrated in FIG. 18.
Figure 20:
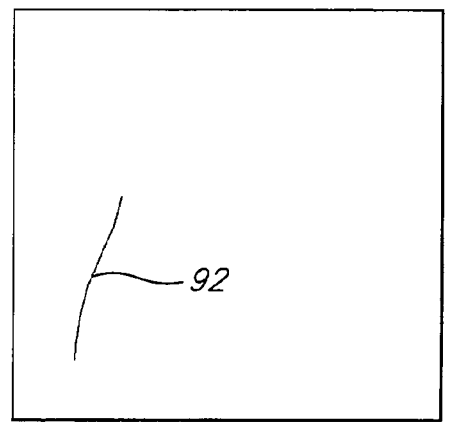
FIG. 20 illustrates a leading edge reference image signal derived from the image of FIG. 19.

Referring to FIGS. 18–20, the lower boundary of the avoidance zone 16 is constructed by extracting the leading edge profile of several images with an occupant's knees placed at a safe distance and height from the airbag cover, wherein FIG. 18 illustrates an image from the camera 26 with the light curtain 22 ON for one knee position. At each knee position, an image is saved with the light curtain 22 ON and OFF, and with an approximately two millisecond interval between the image, the inter-image motion is negligible. The ON-OFF consecutive image pairs are preprocessed in accordance with the image preprocessing process 1000 described hereinabove, so as to produce a corresponding binary binned image signal 51. This process is repeated for various occupant and knee positions so as to generate a plurality of binary binned image signals 51, which are shown superimposed in FIG. 19, from which a composite leading edge 92 is recovered as the left-most unity level pixel, i.e. the leading edge pixels—for each image row using a row-wise search. Referring to FIG. 20, a best fit, piecewise, linear function is then computed from the leading edge pixels so as to define the lower boundary 94 of the avoidance zone 16.

The surface 24 of the avoidance zone 16 and the associated avoidance zone boundary 82 are located at least a minimum safe distance from the air bag inflator 18. The left 96, right 98 and top 100 boundaries of the avoidance zone 16 are determined by repeating the hereinabove describe process for determining the lower boundary 94, but using a planar surface template representing the extent of the boundary 82 of the avoidance zone 16, wherein the planar surface template is located nearly parallel to the light curtain 22 so that the planar surface thereof is illuminated thereby. The size and shape of the planar surface template may be determined, for example, by several of various occupant simulation techniques, for example, computer simulation or the use of instrumented dummies.

Figure 21:
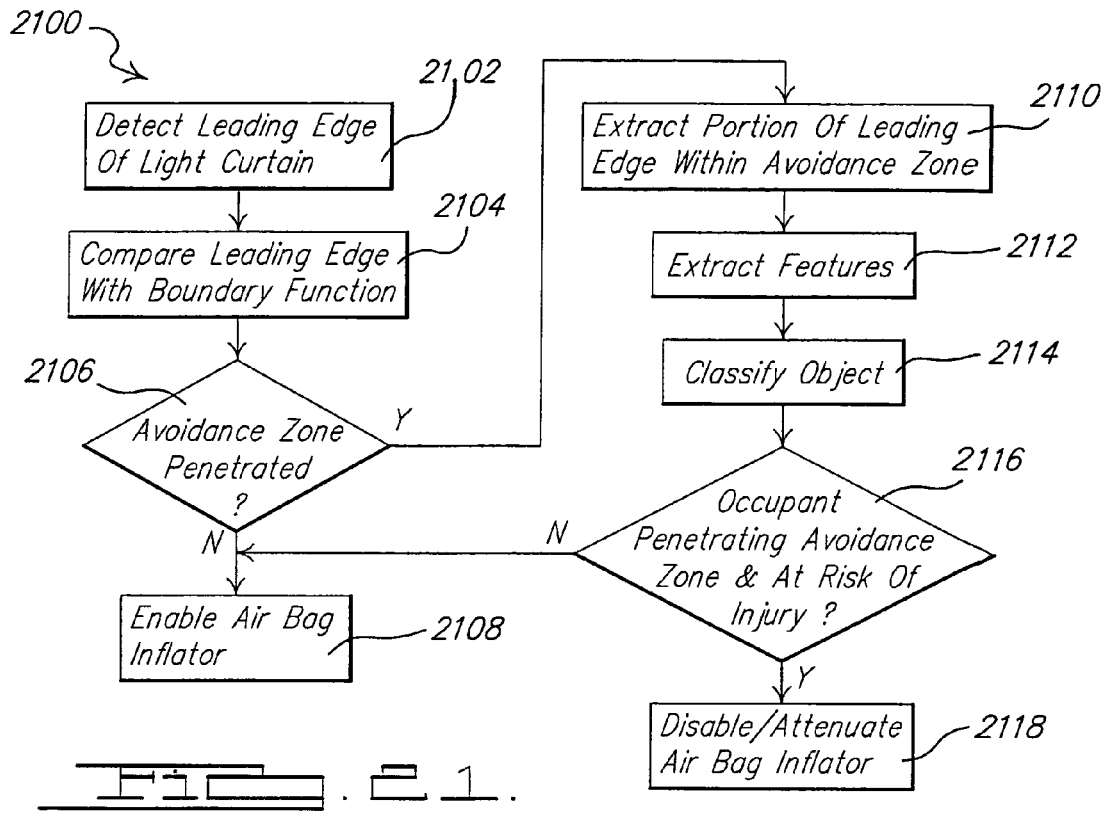
FIG. 21 illustrates a process for detecting an object penetrating an avoidance zone.

Given the definition of the avoidance zone boundary 82, referring to FIG. 21, the occupant detection process 2100 proceeds in step (2102) with using a row-wise search to detect the leading edge 92—i.e. the left-most unity-valued pixel for each row in the two-dimensional pixel space 84—from the binary binned image signal 51 generated by the image preprocessing process 1000. Then, in step (2104), this leading edge 92 is compared with the lower boundary 94 of the avoidance zone 16 on a row-by-row basis. Penetration of the avoidance zone 16 by an object is detected as a left shift, of a specified magnitude, by the binary binned image signal 51 along any row within the extent of the lower boundary 94 of the avoidance zone 16. Furthermore, for the arrangement of the light source 22 and camera 26 as described hereinabove, the image preprocessing and processing processes need only process at least pixels to the left of the lower boundary 94 of the avoidance zone 16 in order to detect and classify a penetration of the avoidance zone 16. If, in step (2106), a penetration into the avoidance zone 16 not detected, then in step (2108), the air bag inflator 18 is enabled for deployment responsive to a signal from the crash sensor 80.

Figure 22A:
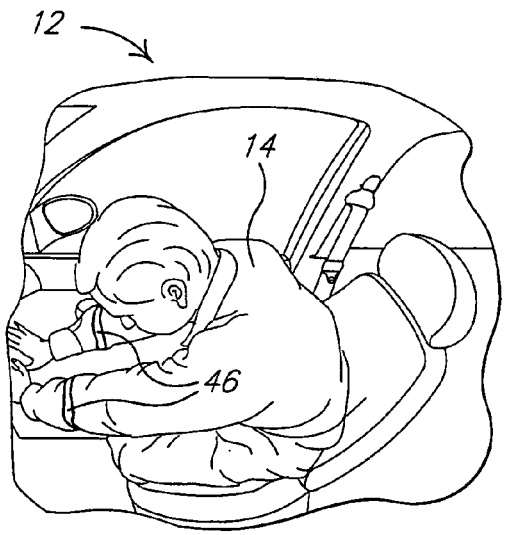
FIG. 22a illustrates an image of an occupant whose hands are touching an instrument panel so as to intersect a light curtain, as an example of a first class of objects.
Figure 22B:
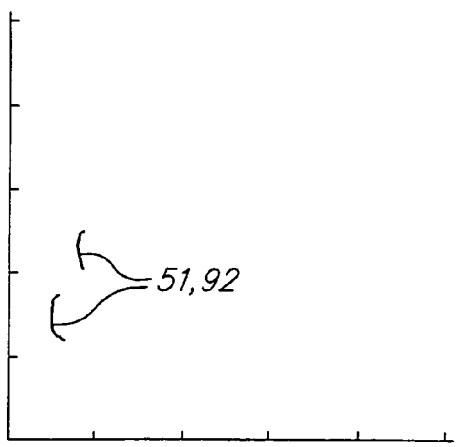
Figure 23B:
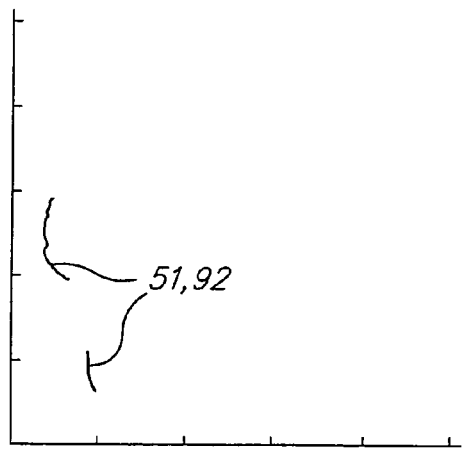
Figure 24A:
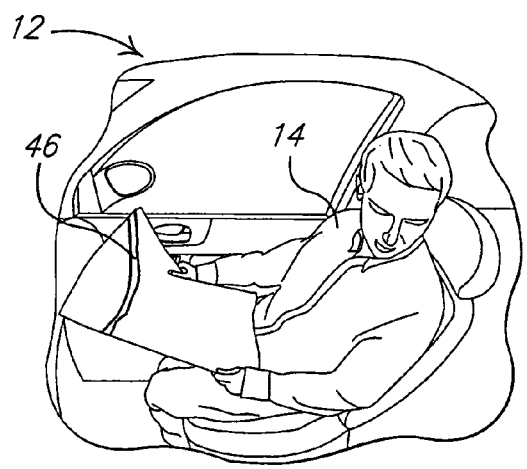
FIG. 24a illustrates an image of an occupant holding a newspaper so as to intersect a light curtain, as an example of a third class of objects.
Figure 24B:
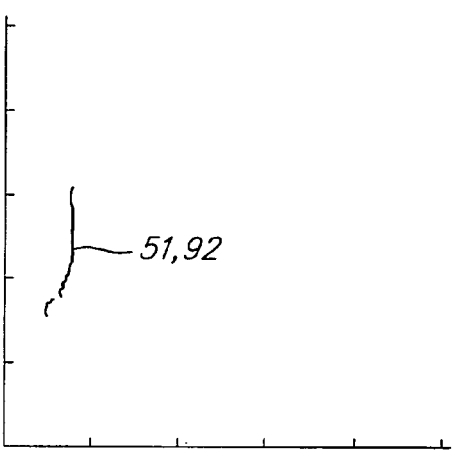

Otherwise, from step (2106), in step (2110), the portion of the sampled profile of the leading edge 92 that is within the avoidance zone boundary 82 is extracted, and a clutter-removal filtering operation is performed to eliminate small clusters of connected pixels. Then, in step (2112), a set of features are extracted from this portion of the leading edge 92. For example, a 10-element feature vector was used to classify an occupant 14 penetrating the avoidance zone 16 into one of the following three classes: arms-on-dash, head-on-dash, or normally-seated occupant holding a newspaper or map (NP), as respectively illustrated by examples of images in FIGS. 22a, 23a and 24a, and associated leading edge 92 image signals in FIGS. 22b, 23b and 24b. The 10-element feature vector included the following feature elements: number of lobes, initial and final vertical positions, minimum and maximum lateral positions, curve length, linear expanse, signed concavity, lobe-to-reference norm, & lobe width. The elements of the feature vector are selected so as to maximize the differences between the allowable classes of objects. Accordingly, an object penetrating the avoidance zone 16 is represented by 10 discrete floating-point values of the elements of the feature vector.

In step (2114), the particular object is classified by comparing values of the feature elements associated with sampled profile of the leading edge 92 with associated corresponding reference values of the corresponding features, for each of the three classes, wherein, for example, the reference values were calculated using training data from about 300 trials for each class.

Figure 25:
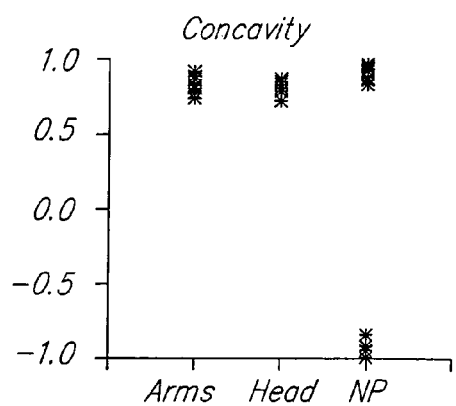
FIG. 25 illustrates, for a set of training examples, a scatter plot of values a concavity feature, classified by object type.
Figure 26:
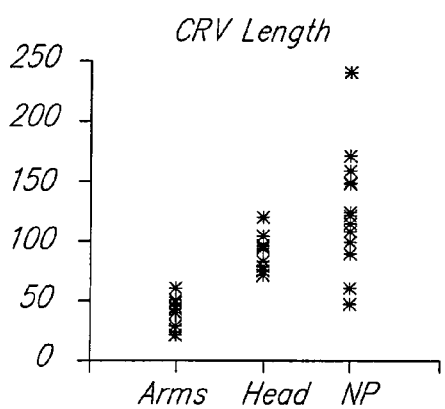
FIG. 26 illustrates, for the same set of training examples as used for FIG. 25, a scatter plot of values a curve length feature, classified by object type.

As one example of a classification process, the feature vector is classified using a rule-based voting scheme, wherein each feature element is compared against a known range of values for that feature element, as derived from the training images. Each element of the feature vector can cast a vote for one of the three classes based upon the values from the training images. For example, FIGS. 25 and 26 respectively illustrate scatter plots showing the ranges of the concavity and curve length feature elements for each of the three object classes from the training data, thereby illustrating the associated intra-class clustering and inter-class separation. Principal components analysis is used to determine combination votes, involving multiple features. Two or more features are required to simultaneously satisfy specified conditions in order to cast a vote for a specified class (e.g. if the feature vector had a signed concavity<0.0 AND a curve length>100, a vote would be cast for the NP class). Combination votes extend the simple thresholds of a typical rule-based decision scheme (e.g. if the feature vector had a curve length>150 a vote would be cast for the NP class). After all votes are cast, upon exit of the voting scheme, the object is classified in the class with the maximum number of votes. In the case of a tie between head penetration and another class, the object is classified as a head penetration, so as to err on the side of enabling the air bag inflator 18, for safety reasons.

Other classification techniques could also be utilized. For example, the sampled profile of the leading edge 92 could be classified into one of the three classes based upon a minimal deviation between the values of the features of the sampled profile and the corresponding values of the corresponding reference set features, or the classification may be accomplished using a neural network, or a statistical classification technique, e.g. a Bayes classifier or a maximum likelihood classifier.

If, from step (2116), as a result of the classification process, the object penetrating the avoidance zone 16 is classified as an occupant who would be at risk of injury, e.g. the head-on-dash class, then in step (2118), the air bag inflator 18 is either disabled or otherwise attenuated so as to prevent injury thereby to an occupant if the vehicle 12 is then involved in a crash. The process then repeats with step (1002). Otherwise, from step (2116), the air bag inflator 18 is enabled in step (2108), and process repeats with step (1002).

The above described occupant detection process 2100 can be extended to recognize other classes of objects, provided that there exists a set of features that exhibit distinct characteristics amongst classes. The accuracy of the detection process is dependent upon the integrity of the binary binned image signal 51.

For a sufficiently fast camera 26 and a sufficiently fast associated image processor 48, a penetration of a portion of an occupant 14 though the light curtain 22, e.g. as illustrated in FIG. 2, can be recognized by the image processor 48 sufficiently fast to dynamically suppress an inflation of the air bag inflator 18 during a crash event, so as to control the actuation of the associated air bag inflator 18 responsive to the position of an occupant 14 at the time the air bag inflator 18 might otherwise be actuated responsive to a crash. For example, the camera 26 may comprise a relatively high speed CMOS camera 26, e.g. imaging at a rate of 500 images per second.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

We claim:

1. A method of detecting a penetration of a bounding surface of an avoidance zone in a region of space of in a vehicle proximate to an air bag inflator, comprising:
   a. generating an image signal representative of a first image of said region of space from a first location, wherein said region of space includes the bounding surface of the avoidance zone, and said image signal is generated responsive to an exposure time;
   b. projecting from a second location a light curtain substantially parallel to and along a first surface, wherein said light curtain has a thickness within a cross-section normal to said first surface, said thickness is adapted so that an intensity of said light curtain within said cross-section is less than a first threshold, said first threshold corresponds to an intensity level that is safe for direct viewing by a human eye, and said first surface is proximate to the bounding surface of said avoidance zone;
   c. generating an image signal representative of a second image of said region of space from said first location, wherein said region of space is intersected by said light curtain when said light curtain is activated;
   d. subtracting said first image from said second image so as to form a difference image;
   e. forming a binned image value of a binned image by accumulating a plurality of pixel values within a region of said difference image;
   f. repeating the operation of forming said binned image value for a plurality of adjacent regions of said difference image;
   g. detecting from said binned image a leading edge associated with an image of said light curtain; and
   h. determining whether or not an object is located in said avoidance zone responsive to a comparison of said leading edge with a reference image signal representing a boundary of said avoidance zone.

2. A method of detecting a penetration of a bounding surface of an avoidance zone in a region of space of in a vehicle proximate to an air bag inflator as recited in claim 1, wherein said first location is proximate to a headliner of the vehicle.

3. A method of detecting a penetration of a bounding surface of an avoidance zone in a region of space of in a vehicle proximate to an air bag inflator as recited in claim 2, wherein said first location is proximate to the centerline of the vehicle.

4. A method of detecting a penetration of a bounding surface of an avoidance zone in a region of space of in a vehicle proximate to an air bag inflator as recited in claim 1, further comprising:

a. identifying a mask region within said first image, wherein said mask region at least partially surrounds a region illuminated by said light curtain;
b. determining the number of pixels within said mask region having pixel values greater than a first threshold; and
c. comparing said number of pixels with a second threshold, and if said number of pixels exceeds said second threshold, then reducing said exposure time and recapturing said first image.

5. A method of detecting a penetration of a bounding surface of an avoidance zone in a region of space of in a vehicle proximate to an air bag inflator as recited in claim 1, wherein said first surface comprises a plane.

6. A method of detecting a penetration of a bounding surface of an avoidance zone in a region of space of in a vehicle proximate to an air bag inflator as recited in claim 1, wherein said first surface is substantially vertical.

7. A method of detecting a penetration of a bounding surface of an avoidance zone in a region of space of in a vehicle proximate to an air bag inflator as recited in claim 1, wherein said first location is displaced rearwards from said second location.

8. A method of detecting a penetration of a bounding surface of an avoidance zone in a region of space of in a vehicle proximate to an air bag inflator as recited in claim 1, further comprising:
a. determining the maximum value of a pixel of said second image; and
b. comparing said maximum value with a third threshold, and if said maximum value is less than said third threshold, then increasing said exposure time for a subsequent operation of generating an image signal.

9. A method of detecting a penetration of a bounding surface of an avoidance zone in a region of space of in a vehicle proximate to an air bag inflator as recited in claim 1, wherein said light curtain comprises near-infrared light, and the operations of capturing said first and second images comprise capturing light that is within a frequency range that includes at least one frequency of said near-infrared light.

10. A method of detecting a penetration of a bounding surface of an avoidance zone in a region of space of in a vehicle proximate to an air bag inflator as recited in claim 1, wherein at least one of said operations of generating an image signal, subtracting said first image from said second image, forming a binned image value, and detecting a leading edge are substantially limited to a region of said first and second images that is on one side of a lower boundary of said avoidance zone.

11. A method of detecting a penetration of a bounding surface of an avoidance zone in a region of space of in a vehicle proximate to an air bag inflator as recited in claim 1, further comprising:
a. detecting the portion of said leading edge that corresponds to a region within said avoidance zone;
b. determining at least one feature of said portion of said leading edge that corresponds to a region within said avoidance zone; and
c. classifying the penetration of said avoidance zone, responsive to at least one comparison of said at least one feature with a corresponding at least one set of reference values of said at least one feature.

12. A method of detecting a penetration of a bounding surface of an avoidance zone in a region of space of in a vehicle proximate to an air bag inflator as recited in claim 1, wherein said at least one feature comprises a plurality of features, and said operation of classifying the penetration of said avoidance zone comprises determining a plurality of most likely classifications, each of said plurality of most likely classifications is based upon a comparison of one of said plurality of features with associated reference values for said one of said plurality of features for each possible result of said classification, and determining a resultant most likely classification by tallying said plurality of most likely classifications.

13. A method of detecting a penetration of a bounding surface of an avoidance zone in a region of space of in a vehicle proximate to an air bag inflator as recited in claim 11, further comprising controlling the actuation of the air bag inflator responsive the classification of said penetration of said avoidance zone.

14. A method of processing an image, comprising:
a. capturing a first image with an image sensor, wherein said first image comprises a first plurality of pixels, each pixel of said first plurality of pixels has a first pixel value, and said first plurality of pixels of said first image has an associated first plurality of first pixel values;
b. storing said plurality of first pixel values in a first memory;
c. capturing a second image with said image sensor, wherein said second image comprises said first plurality of pixels, each pixel of said first plurality of pixels has a second pixel value, said first plurality of pixels of said second image has an associated first plurality of second pixel values, and for both of said first image and said second image, said first plurality of pixels correspond to an array of a second plurality of rows and a third plurality of columns;
d. for a fourth plurality of said first plurality of pixels along one of said rows, or for a fifth plurality of said first plurality of pixels along one of said columns, performing a set of steps comprising:
i. computing a difference value as a difference between said first pixel value and said second pixel value for a corresponding pixels in said first image and said second image;
ii. replacing said first pixel value with said second pixel value in said first memory; and
iii. adding said difference value to a first accumulated value in a second memory that is initialized to zero;
e. adding said first accumulated value to a second accumulated value in a third memory that is initialized to zero; and
f. if step d is performed along one of said rows, then repeating steps d and e for different adjacent columns until a fifth plurality of said first accumulated values have been added to said second accumulated value, otherwise, if step d is performed along one of said columns, then repeating steps d and e for different adjacent rows until a fourth plurality of said first accumulated values have been added to said second accumulated value.

15. A method of processing an image as recited in claim 14, wherein steps d and e are performed for either an entire said row or an entire said column before proceeding with step f.

* * * * *

UNITED STATES PATENT AND TRADEMARK OFFICE
CERTIFICATE OF CORRECTION

PATENT NO. : 6,968,073 B1  
DATED : December 1, 2005  
INVENTOR(S) : Michael E. O'Boyle et al.

Page 1 of 1

It is certified that error appears in the above-identified patent and that said Letters Patent is hereby corrected as shown below:

<u>Column 9,</u>
Line 32, delete "Inage" and insert -- Image -- before "6: light curtain".
Line 32, delete "3" after "ON-Image" and insert -- 5 --.

<u>Column 10,</u>
Line 29, delete "to" after "Referring".

<u>Column 14,</u>
Line 33, delete "1" after "length" and insert -- $\lambda$ --.
Line 38, delete "1" after "$x_p=$" and insert -- $\lambda$ --.
Line 40, delete "1" after "$y_p=$" and insert -- $\lambda$ --.
Line 42, delete "1" after "$z_p=$" and insert -- $\lambda$ --.
Line 46, delete "1" after "solving for" and insert -- $\lambda$ --.
Line 46, delete "1" after "the value of" and insert -- $\lambda$ --.

<u>Column 18,</u>
Lines 18, 54, 59 and 64, delete "of" after "region of space".

<u>Column 19,</u>
Lines 12, 16, 19, 25, 35, 42, 51 and 64, delete "of" after "region of space".

<u>Column 20,</u>
Line 12, delete "of" after "region of space".

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,968,073 B1  Page 1 of 1
DATED : November 22, 2005
INVENTOR(S) : Michael E. O'Boyle et al.

It is certified that error appears in the above-identified patent and that said Letters Patent is hereby corrected as shown below:

Column 9,
Line 32, delete "Inage" and insert -- Image -- before "6: light curtain".
Line 32, delete "3" after "ON-Image" and insert -- 5 --.

Column 10,
Line 29, delete "to" after "Referring".

Column 14,
Line 33, delete "1" after "length" and insert -- $\lambda$ --.
Line 38, delete "1" after "$x_p=$" and insert -- $\lambda$ --.
Line 40, delete "1" after "$y_p=$" and insert -- $\lambda$ --.
Line 42, delete "1" after "$z_p=$" and insert -- $\lambda$ --.
Line 46, delete "1" after "solving for" and insert -- $\lambda$ --.
Line 46, delete "1" after "the value of" and insert -- $\lambda$ --.

Column 18,
Lines 18, 54, 59 and 64, delete "of" after "region of space".

Column 19,
Lines 12, 16, 19, 25, 35, 42, 51 and 64, delete "of" after "region of space".

Column 20,
Line 12, delete "of" after "region of space".

This certificate supersedes Certificate of Correction issued April 11, 2006.

Signed and Sealed this

Second Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 6,968,073 B1
APPLICATION NO. : 10/132349
DATED : November 22, 2005
INVENTOR(S) : Michael E. O'Boyle et al.

It is certified that error appears in the above-identified patent and that said Letters Patent is hereby corrected as shown below:

Item [75]
In the list of inventors on the face of the patent, "Debbie E. Nachtegall, Royal Oak, MI (US);" should be deleted.

Signed and Sealed this

Twenty-ninth Day of April, 2008

JON W. DUDAS
*Director of the United States Patent and Trademark Office*